United States Patent
Chang

(10) Patent No.: US 11,467,856 B2
(45) Date of Patent: Oct. 11, 2022

(54) PORTABLE USB DEVICE FOR INTERNET ACCESS SERVICE

(75) Inventor: William Ho Chang, Vancouver, WA (US)

(73) Assignee: Flexiworld Technologies, Inc., Vancouver, WA (US)

(*) Notice: Subject to any disclaimer, the term of this patent is extended or adjusted under 35 U.S.C. 154(b) by 254 days.

(21) Appl. No.: 10/734,481

(22) Filed: Dec. 12, 2003

(65) Prior Publication Data

US 2004/0127254 A1    Jul. 1, 2004

Related U.S. Application Data

(60) Provisional application No. 60/433,196, filed on Dec. 12, 2002.

(51) Int. Cl.
*G06F 15/16* (2006.01)
*G06F 15/177* (2006.01)
(Continued)

(52) U.S. Cl.
CPC ............ *G06F 9/44584* (2013.01); *G06F 8/61* (2013.01); *G06F 21/60* (2013.01); *H04W 92/00* (2013.01); *G06F 2213/0042* (2013.01)

(58) Field of Classification Search
CPC .................................................... H04W 92/00
(Continued)

(56) References Cited

U.S. PATENT DOCUMENTS 5,166,809 A    11/1992 Surbrook
5,220,674 A     6/1993 Morgan et al.
(Continued)

FOREIGN PATENT DOCUMENTS

CN    1345497        4/2002
DE    19846452 A1   12/1999
(Continued)

OTHER PUBLICATIONS

World Intellectual Property Organization (Thomas C. Lee, authorized officer);International Search Report for PCT/US20041011372; mailed Jun. 20, 2007; 3 pages. William Ho Chang is an inventor for both PCT/US2004/011372 and U.S. Appl. No. 10/734,481.
(Continued)

*Primary Examiner* — Joshua Joo
(74) *Attorney, Agent, or Firm* — Chernoff, Vilhauer, McClung & Stenzel, LLP

(57) ABSTRACT

A portable communication device includes a USB interface that is connectable to and disconnectable from an external USB port of a computing device by a user for enabling Internet access service to the computing device. In an example application, the portable communication device may include a wireless communication component with baseband and radio components. Upon connecting the portable communication device to the external USB port of the computing device by the user, the portable communication device activates wireless Internet service with protected data stored in the portable communication device, and the computing device is thereby enabled with wireless mobile Internet access on the go. The portable communication device may further provide Internet sharing feature to other wireless devices over a local wireless communication link that may be compatible to a protocol within IEEE 802.11. The portable communication device may be configured as an adapter sized dongle.

91 Claims, 14 Drawing Sheets

(51) Int. Cl.
  *G06F 9/445* (2018.01)
  *G06F 8/61* (2018.01)
  *H04W 92/00* (2009.01)
  *G06F 21/60* (2013.01)

(58) Field of Classification Search
  USPC ............... 709/250, 200, 204, 220; 710/8–10
  See application file for complete search history.

(56) References Cited

U.S. PATENT DOCUMENTS

| | | | |
|---|---|---|---|
| 5,287,194 A | 2/1994 | Lobiondo | |
| 5,337,258 A | 8/1994 | Dennis | |
| 5,404,433 A | 4/1995 | Hosogai | |
| 5,412,798 A | 5/1995 | Garney | |
| 5,519,641 A | 5/1996 | Beers et al. | |
| 5,564,109 A | 10/1996 | Snyder et al. | |
| 5,580,177 A | 12/1996 | Gase et al. | |
| 5,596,697 A | 1/1997 | Foster et al. | |
| 5,604,843 A | 2/1997 | Shaw et al. | |
| 5,613,123 A | 3/1997 | Tsang et al. | |
| 5,619,250 A | 4/1997 | McClellan et al. | |
| 5,619,649 A | 4/1997 | Kovnat et al. | |
| 5,699,495 A | 12/1997 | Snipp | |
| 5,705,781 A | 1/1998 | Habedank et al. | |
| 5,708,780 A | 1/1998 | Levergood et al. | |
| 5,761,480 A | 6/1998 | Fukada et al. | |
| 5,796,442 A | 8/1998 | Gove et al. | |
| 5,815,194 A | 9/1998 | Ueda | |
| 5,832,191 A | 11/1998 | Thorne | |
| 5,867,633 A | 2/1999 | Taylor, III et al. | |
| 5,911,044 A | 6/1999 | Lo et al. | |
| 5,926,104 A | 7/1999 | Robinson | |
| 5,926,624 A | 7/1999 | Katz et al. | |
| 5,933,498 A | 8/1999 | Schneck et al. | |
| 5,940,843 A | 8/1999 | Zucknovich et al. | |
| 5,974,312 A | 10/1999 | Hayes, Jr. et al. | |
| 5,982,520 A * | 11/1999 | Weiser et al. | 398/126 |
| 5,987,454 A | 11/1999 | Hobbs | |
| 6,009,464 A | 12/1999 | Hamilton et al. | |
| 6,020,973 A | 2/2000 | Levine et al. | |
| 6,037,981 A | 3/2000 | Wilson et al. | |
| 6,043,898 A | 3/2000 | Jacobs | |
| 6,044,428 A | 3/2000 | Rayabhari | |
| 6,046,820 A | 4/2000 | Konishi | |
| 6,061,452 A | 5/2000 | Suzuki | |
| 6,070,185 A | 5/2000 | Anupam et al. | |
| 6,091,956 A | 7/2000 | Hollenberg | |
| 6,119,153 A | 9/2000 | Dujari et al. | |
| 6,138,178 A | 10/2000 | Watanabe | |
| 6,141,659 A | 10/2000 | Barker et al. | |
| 6,148,081 A | 11/2000 | Szymanski et al. | |
| 6,148,346 A | 11/2000 | Hanson | |
| 6,157,809 A | 12/2000 | Kambayashi | |
| 6,167,514 A | 12/2000 | Matsui et al. | |
| 6,169,789 B1 | 1/2001 | Rao et al. | |
| 6,202,023 B1 * | 3/2001 | Hancock et al. | 701/201 |
| 6,205,429 B1 | 3/2001 | Peng | |
| 6,216,183 B1 | 4/2001 | Rawlins | |
| 6,225,993 B1 | 5/2001 | Lindblad et al. | |
| 6,233,611 B1 | 5/2001 | Ludtke et al. | |
| 6,246,486 B1 | 6/2001 | Takahashi | |
| 6,251,014 B1 | 6/2001 | Stockdale et al. | |
| 6,256,666 B1 | 7/2001 | Singhal | |
| 6,263,387 B1 | 7/2001 | Chrabaszcz | |
| 6,263,392 B1 | 7/2001 | McCauley | |
| 6,279,153 B1 | 8/2001 | Bi et al. | |
| 6,282,710 B1 | 8/2001 | Boehler | |
| 6,285,889 B1 | 9/2001 | Nykanen et al. | |
| 6,288,790 B1 | 9/2001 | Yellepeddy et al. | |
| 6,324,521 B1 | 11/2001 | Shiota et al. | |
| 6,330,611 B1 | 12/2001 | Itoh et al. | |
| 6,339,706 B1 | 1/2002 | Tillgren et al. | |
| 6,353,928 B1 | 3/2002 | Altberg et al. | |
| 6,360,364 B1 * | 3/2002 | Chen | G06F 8/61 711/169 |
| 6,363,452 B1 | 3/2002 | Lach | |
| 6,366,912 B1 | 4/2002 | Wallent et al. | |
| 6,366,965 B1 | 4/2002 | Binford et al. | |
| 6,366,966 B1 | 4/2002 | Laney et al. | |
| 6,370,686 B1 | 4/2002 | Delo et al. | |
| 6,379,058 B1 | 4/2002 | Petteruti et al. | |
| 6,389,010 B1 | 5/2002 | Kubler et al. | |
| 6,389,159 B2 | 5/2002 | Gilman et al. | |
| 6,396,531 B1 | 5/2002 | Gerszberg et al. | |
| 6,405,362 B1 * | 6/2002 | Shih et al. | 717/174 |
| 6,418,439 B1 | 7/2002 | Papierniak et al. | |
| 6,418,554 B1 | 7/2002 | Delo et al. | |
| 6,421,748 B1 | 7/2002 | Lin et al. | |
| 6,426,798 B1 | 7/2002 | Yeung | |
| 6,434,535 B1 | 8/2002 | Kupka et al. | |
| 6,449,052 B1 | 9/2002 | Sherer et al. | |
| 6,452,692 B1 | 9/2002 | Yacoub | |
| 6,453,127 B2 | 9/2002 | Wood et al. | |
| 6,473,800 B1 | 10/2002 | Jerger et al. | |
| 6,477,575 B1 | 11/2002 | Koeppel et al. | |
| 6,480,292 B1 | 11/2002 | Sugiyama | |
| 6,484,219 B1 | 11/2002 | Dunn et al. | |
| 6,487,587 B1 | 11/2002 | Dubey | |
| 6,487,599 B1 | 11/2002 | Smith et al. | |
| 6,493,104 B1 | 12/2002 | Cromer et al. | |
| 6,496,802 B1 | 12/2002 | vanZoest et al. | |
| 6,529,522 B1 | 3/2003 | Ito et al. | |
| 6,532,368 B1 | 3/2003 | Hild et al. | |
| 6,545,722 B1 | 4/2003 | Schultheiss et al. | |
| 6,546,387 B1 | 4/2003 | Triggs | |
| 6,546,419 B1 | 4/2003 | Humpleman et al. | |
| 6,550,008 B1 | 4/2003 | Zhang et al. | |
| 6,553,431 B1 | 4/2003 | Yamamoto et al. | |
| 6,556,313 B1 | 4/2003 | Chang et al. | |
| 6,560,651 B2 | 5/2003 | Katz et al. | |
| 6,584,903 B2 | 7/2003 | Jacobs | |
| 6,590,588 B2 | 7/2003 | Lincke et al. | |
| 6,594,723 B1 | 7/2003 | Chapman et al. | |
| 6,600,569 B1 | 7/2003 | Osada et al. | |
| 6,601,093 B1 | 7/2003 | Peters | |
| 6,603,744 B2 * | 8/2003 | Mizutani et al. | 370/310 |
| 6,604,135 B1 | 8/2003 | Rogers et al. | |
| 6,604,140 B1 | 8/2003 | Beck et al. | |
| 6,607,314 B1 | 8/2003 | McCannon et al. | |
| 6,608,928 B1 | 8/2003 | Queiroz | |
| 6,611,812 B2 | 8/2003 | Hurtado et al. | |
| 6,615,404 B1 | 9/2003 | Garfunkel et al. | |
| 6,622,018 B1 | 9/2003 | Erekson | |
| 6,623,527 B1 | 9/2003 | Hamzy | |
| 6,625,472 B1 * | 9/2003 | Farazmandnia et al. | 455/557 |
| 6,625,761 B1 | 9/2003 | Sartore et al. | |
| 6,628,417 B1 | 9/2003 | Naito et al. | |
| 6,633,395 B1 | 10/2003 | Tuchitoi et al. | |
| 6,636,929 B1 | 10/2003 | Frantz et al. | |
| 6,654,135 B2 | 11/2003 | Mitani | |
| 6,658,625 B1 | 12/2003 | Allen | |
| 6,662,224 B1 | 12/2003 | Angwin et al. | |
| 6,671,068 B1 | 12/2003 | Chang et al. | |
| 6,678,751 B1 | 1/2004 | Hays et al. | |
| 6,694,371 B1 | 2/2004 | Sanai | |
| 6,697,848 B2 | 2/2004 | Hamilton et al. | |
| 6,701,009 B1 | 3/2004 | Makoto et al. | |
| 6,705,781 B2 | 3/2004 | Iwazaki | |
| 6,730,686 B1 | 5/2004 | Baynes et al. | |
| 6,732,179 B1 | 5/2004 | Brown et al. | |
| 6,735,766 B1 | 5/2004 | Chamberlain et al. | |
| 6,735,768 B1 | 5/2004 | Tanaka | |
| 6,745,229 B1 | 6/2004 | Gobin et al. | |
| 6,745,255 B2 * | 6/2004 | Yen et al. | 710/13 |
| 6,751,732 B2 | 6/2004 | Strobel et al. | |
| 6,753,978 B1 | 6/2004 | Chang | |
| 6,757,070 B1 | 6/2004 | Lin et al. | |
| 6,757,783 B2 | 6/2004 | Koh | |
| 6,760,745 B1 | 7/2004 | Tan et al. | |
| 6,772,233 B2 * | 8/2004 | Iida et al. | 710/13 |
| 6,785,727 B1 | 8/2004 | Yamazaki | |
| 6,788,428 B1 | 9/2004 | Shimokawa | |
| 6,798,530 B1 | 9/2004 | Buckley et al. | |
| 6,826,632 B1 | 11/2004 | Wugofski | |

(56) References Cited

U.S. PATENT DOCUMENTS

| | | | |
|---|---|---|---|
| 6,829,672 B1 | 12/2004 | Deng et al. | |
| 6,830,340 B2 | 12/2004 | Olson et al. | |
| 6,839,771 B1 | 1/2005 | Bouchier et al. | |
| 6,840,441 B2 | 1/2005 | Monaghan et al. | |
| 6,845,398 B1 | 1/2005 | Galensky et al. | |
| 6,857,716 B1 | 2/2005 | Nagahashi | |
| 6,859,228 B1 | 2/2005 | Chang et al. | |
| 6,885,362 B2 | 4/2005 | Suomela | |
| 6,889,058 B2* | 5/2005 | Tordera | 455/557 |
| 6,892,230 B1 | 5/2005 | Gu et al. | |
| 6,895,444 B1 | 5/2005 | Weisshaar et al. | |
| 6,898,652 B2* | 5/2005 | Peters et al. | 710/300 |
| 6,910,068 B2 | 6/2005 | Zintel et al. | |
| 6,922,725 B2 | 7/2005 | Lamming et al. | |
| 6,941,014 B2 | 9/2005 | Lin et al. | |
| 6,944,687 B2* | 9/2005 | Doragh et al. | 710/46 |
| 6,947,995 B2 | 9/2005 | Chang et al. | |
| 6,948,165 B1* | 9/2005 | Luu et al. | 717/172 |
| 6,952,831 B1 | 10/2005 | Moore | |
| 6,975,644 B2* | 12/2005 | Tordera et al. | 370/463 |
| 7,028,102 B1 | 4/2006 | Larsson et al. | |
| 7,047,302 B1 | 5/2006 | Chatani et al. | |
| 7,050,840 B2* | 5/2006 | Lin et al. | 455/574 |
| 7,054,296 B1 | 5/2006 | Sorrells et al. | |
| 7,055,956 B2 | 6/2006 | Olson et al. | |
| 7,069,578 B1 | 6/2006 | Prus et al. | |
| 7,076,534 B1 | 7/2006 | Cleron et al. | |
| 7,085,814 B1 | 8/2006 | Gandhi et al. | |
| 7,099,304 B2 | 8/2006 | Liu et al. | |
| 7,102,691 B2 | 9/2006 | Dischert et al. | |
| 7,127,541 B2 | 10/2006 | Govindarajulu et al. | |
| 7,136,914 B2* | 11/2006 | Motoyama | 709/223 |
| 7,143,408 B2 | 11/2006 | Anderson et al. | |
| 7,149,726 B1 | 12/2006 | Lingle et al. | |
| 7,149,834 B2* | 12/2006 | Peters et al. | 710/300 |
| 7,158,953 B1 | 1/2007 | DeMello et al. | |
| 7,164,885 B2 | 1/2007 | Jonsson et al. | |
| 7,174,535 B2 | 2/2007 | Wragge | |
| 7,180,475 B2 | 2/2007 | Slobodin et al. | |
| 7,230,939 B2* | 6/2007 | Toyoshima | H04L 12/2803 370/338 |
| 7,237,046 B2 | 6/2007 | Paley et al. | |
| 7,239,346 B1 | 7/2007 | Priddy | |
| 7,243,153 B2 | 7/2007 | McIntyre et al. | |
| 7,260,390 B1* | 8/2007 | Skinner | G06F 1/1626 379/201.01 |
| 7,269,668 B2* | 9/2007 | Redford et al. | 710/8 |
| 7,318,086 B2 | 1/2008 | Chang et al. | |
| 7,345,347 B2 | 3/2008 | Ohkubo et al. | |
| 7,353,416 B2* | 4/2008 | Jeansonne et al. | 713/324 |
| 7,355,732 B2 | 4/2008 | Yamaguchi | |
| 7,356,347 B1 | 4/2008 | Kammer | |
| 7,370,090 B2 | 5/2008 | Nakaoka et al. | |
| 7,484,245 B1 | 1/2009 | Friedman et al. | |
| 7,577,910 B1 | 8/2009 | Husemann et al. | |
| 7,580,005 B1 | 8/2009 | Palin | |
| 7,609,402 B2 | 10/2009 | Chang et al. | |
| 7,630,721 B2 | 12/2009 | Ortiz | |
| 7,644,018 B1 | 1/2010 | Yukie et al. | |
| 7,704,147 B2 | 4/2010 | Quraishi et al. | |
| RE41,416 E | 7/2010 | Liu et al. | |
| RE41,487 E | 8/2010 | Liu et al. | |
| RE41,532 E | 8/2010 | Liu et al. | |
| RE41,689 E | 9/2010 | Liu et al. | |
| 7,805,720 B2 | 9/2010 | Chang et al. | |
| RE41,882 E | 10/2010 | Liu et al. | |
| 7,908,401 B2 | 3/2011 | Chang | |
| 7,941,541 B2 | 5/2011 | Chang et al. | |
| 7,944,577 B2 | 5/2011 | Chang et al. | |
| 7,953,818 B2 | 5/2011 | Chang et al. | |
| RE42,725 E | 9/2011 | Chang et al. | |
| RE42,828 E | 10/2011 | Liu et al. | |
| 8,082,491 B1 | 12/2011 | Abdelaziz et al. | |
| 8,082,572 B1 | 12/2011 | Tilford | |
| RE43,181 E | 2/2012 | Liu et al. | |
| 8,166,949 B2 | 5/2012 | Hicks et al. | |
| 8,169,649 B2 | 5/2012 | Chang et al. | |
| 8,184,324 B2 | 5/2012 | Chang et al. | |
| 8,285,802 B2 | 10/2012 | Chang et al. | |
| 8,296,757 B2 | 10/2012 | Chang et al. | |
| 8,332,521 B2 | 12/2012 | Chang et al. | |
| 8,533,352 B2 | 9/2013 | Chang | |
| 8,595,717 B2 | 11/2013 | Chang et al. | |
| 8,630,000 B2 | 1/2014 | Chang et al. | |
| 8,705,097 B2 | 4/2014 | Chang et al. | |
| 8,711,408 B2 | 4/2014 | Chang et al. | |
| 8,812,398 B2* | 8/2014 | Kuhn et al. | 705/50 |
| 8,964,220 B2 | 2/2015 | Chang et al. | |
| 8,972,610 B2 | 3/2015 | Chang | |
| 8,989,064 B2 | 3/2015 | Chang et al. | |
| 9,036,181 B2 | 5/2015 | Chang et al. | |
| 9,037,088 B2 | 5/2015 | Chang et al. | |
| 9,042,811 B2 | 5/2015 | Chang et al. | |
| 9,043,482 B2 | 5/2015 | Chang | |
| 9,069,510 B2 | 6/2015 | Chang et al. | |
| 9,092,177 B2 | 7/2015 | Chang et al. | |
| 9,110,622 B2 | 8/2015 | Chang et al. | |
| 9,116,723 B2 | 8/2015 | Chang et al. | |
| 9,164,718 B2 | 10/2015 | Chang et al. | |
| 9,298,407 B2 | 3/2016 | Chang et al. | |
| 9,383,956 B2 | 7/2016 | Chang et al. | |
| 9,389,822 B2 | 7/2016 | Chang et al. | |
| 9,798,516 B2 | 10/2017 | Chang et al. | |
| RE46,637 E | 12/2017 | Liu et al. | |
| 9,836,257 B2 | 12/2017 | Chang et al. | |
| 9,836,259 B2 | 12/2017 | Chang et al. | |
| 9,841,935 B2 | 12/2017 | Chang et al. | |
| 9,965,233 B2 | 5/2018 | Chang et al. | |
| 9,971,555 B2 | 5/2018 | Chang et al. | |
| 10,037,178 B2 | 7/2018 | Chang et al. | |
| 10,126,991 B2 | 11/2018 | Chang et al. | |
| 10,133,527 B2 | 11/2018 | Chang et al. | |
| 10,140,071 B2 | 11/2018 | Chang et al. | |
| 10,140,072 B2 | 11/2018 | Chang et al. | |
| 10,140,073 B2 | 11/2018 | Chang et al. | |
| 10,152,285 B2 | 12/2018 | Chang et al. | |
| 10,162,596 B2 | 12/2018 | Chang et al. | |
| 10,261,739 B2 | 4/2019 | Chang et al. | |
| 10,303,411 B2 | 5/2019 | Chang et al. | |
| 10,346,114 B2 | 7/2019 | Chang et al. | |
| 10,359,957 B2 | 7/2019 | Chang et al. | |
| 10,387,087 B2 | 8/2019 | Chang et al. | |
| 10,481,846 B2 | 11/2019 | Chang et al. | |
| 10,481,847 B2 | 11/2019 | Chang et al. | |
| 10,489,096 B2 | 11/2019 | Chang et al. | |
| 10,592,201 B2 | 3/2020 | Chang et al. | |
| 10,592,202 B2 | 3/2020 | Chang et al. | |
| 10,606,535 B2 | 3/2020 | Chang et al. | |
| 10,642,576 B2 | 5/2020 | Chang et al. | |
| RE48,066 E | 6/2020 | Liu et al. | |
| RE48,088 E | 7/2020 | Liu et al. | |
| 10,740,066 B2 | 8/2020 | Chang et al. | |
| 10,761,791 B2 | 9/2020 | Chang et al. | |
| 10,768,871 B2 | 9/2020 | Chang et al. | |
| 10,841,798 B2 | 11/2020 | Chang et al. | |
| 10,846,031 B2 | 11/2020 | Chang et al. | |
| 10,860,290 B2 | 12/2020 | Chang et al. | |
| 10,866,773 B2 | 12/2020 | Chang et al. | |
| 10,873,856 B2 | 12/2020 | Chang et al. | |
| 10,915,296 B2 | 2/2021 | Chang et al. | |
| 10,963,169 B2 | 3/2021 | Chang et al. | |
| 11,029,903 B2 | 6/2021 | Chang et al. | |
| 11,204,729 B2 | 12/2021 | Chang et al. | |
| 2001/0029531 A1 | 10/2001 | Ohta | |
| 2001/0032254 A1* | 10/2001 | Hawkins | 709/219 |
| 2002/0002707 A1 | 1/2002 | Ekel et al. | |
| 2002/0010756 A1 | 1/2002 | Oku | |
| 2002/0012329 A1 | 1/2002 | Atkinson | |
| 2002/0013730 A1 | 1/2002 | Bigus | |
| 2002/0026492 A1 | 2/2002 | Fujita | |
| 2002/0032855 A1* | 3/2002 | Neves et al. | 713/154 |
| 2002/0049580 A1 | 4/2002 | Kutaragi et al. | |
| 2002/0051200 A1 | 5/2002 | Chang et al. | |
| 2002/0058499 A1 | 5/2002 | Ortiz | |

(56) References Cited

U.S. PATENT DOCUMENTS

| | | | |
|---|---|---|---|
| 2002/0065098 A1* | 5/2002 | Hosogaya | 455/552 |
| 2002/0065872 A1* | 5/2002 | Genske et al. | 709/202 |
| 2002/0078161 A1 | 6/2002 | Cheng | |
| 2002/0078367 A1 | 6/2002 | Lang | |
| 2002/0081993 A1 | 6/2002 | Toyoshima | |
| 2002/0083151 A1 | 6/2002 | Adams | |
| 2002/0083430 A1* | 6/2002 | Kusuda et al. | 717/174 |
| 2002/0091843 A1 | 7/2002 | Vaid | |
| 2002/0097408 A1 | 7/2002 | Chang et al. | |
| 2002/0097415 A1 | 7/2002 | Chang et al. | |
| 2002/0097416 A1 | 7/2002 | Chang et al. | |
| 2002/0097417 A1 | 7/2002 | Chang et al. | |
| 2002/0097418 A1 | 7/2002 | Chang et al. | |
| 2002/0097419 A1 | 7/2002 | Chang et al. | |
| 2002/0097433 A1 | 7/2002 | Chang et al. | |
| 2002/0101515 A1 | 8/2002 | Yoshida | |
| 2002/0108054 A1 | 8/2002 | Moore et al. | |
| 2002/0145632 A1 | 10/2002 | Shmueli | |
| 2002/0147912 A1 | 10/2002 | Shmueli et al. | |
| 2002/0169960 A1* | 11/2002 | Iguchi | G06F 21/10 713/174 |
| 2002/0174254 A1 | 11/2002 | Kita et al. | |
| 2002/0178295 A1 | 11/2002 | Buczek et al. | |
| 2003/0028481 A1 | 2/2003 | Flitcroft et al. | |
| 2003/0028797 A1 | 2/2003 | Long et al. | |
| 2003/0046447 A1* | 3/2003 | Kouperchliak et al. | 709/321 |
| 2003/0084256 A1* | 5/2003 | McKee | 711/152 |
| 2003/0087601 A1* | 5/2003 | Agam et al. | 455/39 |
| 2003/0110371 A1 | 6/2003 | Yang | |
| 2003/0110372 A1 | 6/2003 | Proudler | |
| 2003/0112975 A1 | 6/2003 | Taiwanese | |
| 2003/0120754 A1 | 6/2003 | Muto | |
| 2003/0122934 A1 | 7/2003 | Shiohara | |
| 2003/0126298 A1* | 7/2003 | Redford | H04L 12/2898 709/250 |
| 2003/0160993 A1 | 8/2003 | Kang | |
| 2003/0161193 A1* | 8/2003 | Moran | G11C 7/10 365/200 |
| 2003/0182456 A1 | 9/2003 | Lin et al. | |
| 2003/0196007 A1 | 10/2003 | Baron | |
| 2003/0200372 A1 | 10/2003 | Doragh et al. | |
| 2003/0208629 A1 | 11/2003 | Parkman | |
| 2003/0212862 A1* | 11/2003 | James | G06F 9/44573 711/115 |
| 2003/0225971 A1 | 12/2003 | Oishi | |
| 2004/0001088 A1* | 1/2004 | Stancil | G06F 9/4451 715/748 |
| 2004/0006648 A9* | 1/2004 | Kita et al. | 709/250 |
| 2004/0010653 A1* | 1/2004 | Grundy | H04L 12/56 710/315 |
| 2004/0015709 A1* | 1/2004 | Chen et al. | 713/193 |
| 2004/0024688 A1 | 2/2004 | Bi et al. | |
| 2004/0057075 A1 | 3/2004 | Stewart | |
| 2004/0070379 A1* | 4/2004 | Koretsky et al. | 323/282 |
| 2004/0078708 A1* | 4/2004 | Li et al. | 714/43 |
| 2004/0095382 A1* | 5/2004 | Fisher et al. | 345/744 |
| 2004/0127254 A1 | 7/2004 | Chang | |
| 2004/0177355 A1 | 9/2004 | Wragge | |
| 2004/0193900 A1 | 9/2004 | Nair | |
| 2004/0199909 A1* | 10/2004 | Goodman | G06F 13/385 717/168 |
| 2004/0203694 A1 | 10/2004 | Wong et al. | |
| 2005/0005149 A1* | 1/2005 | Hirota et al. | 713/193 |
| 2005/0005263 A1 | 1/2005 | Miyazaki | |
| 2005/0014534 A1 | 1/2005 | Hareng et al. | |
| 2005/0055690 A1 | 3/2005 | Cornillon et al. | |
| 2005/0059380 A1 | 3/2005 | Tomita | |
| 2005/0246436 A1* | 11/2005 | Day et al. | 709/223 |
| 2005/0250536 A1* | 11/2005 | Deng | H04W 76/021 455/558 |
| 2006/0080517 A1 | 4/2006 | Brown | |
| 2006/0112414 A1 | 5/2006 | Ikonen et al. | |
| 2006/0173980 A1 | 8/2006 | Kobayashi et al. | |
| 2007/0038724 A1* | 2/2007 | Toyoshima | H04L 12/2803 709/218 |
| 2007/0081486 A1* | 4/2007 | Koide | 370/328 |
| 2007/0240154 A1 | 10/2007 | Gerzymisch et al. | |
| 2007/0288611 A1 | 12/2007 | Serceki et al. | |
| 2008/0003947 A1* | 1/2008 | Morris | 455/41.2 |
| 2008/0049740 A1 | 2/2008 | Serceki et al. | |
| 2008/0071935 A1* | 3/2008 | Ohta | 710/10 |
| 2008/0126628 A1* | 5/2008 | Mullis et al. | 710/63 |
| 2009/0048978 A1 | 2/2009 | Ginter et al. | |
| 2009/0182903 A1 | 7/2009 | Tordera | |
| 2009/0198839 A1* | 8/2009 | Banerjee et al. | 710/10 |
| 2009/0210868 A1 | 8/2009 | Parthasarathy | |
| 2010/0174631 A1 | 7/2010 | Tian et al. | |
| 2010/0201996 A1 | 8/2010 | Chang et al. | |
| 2010/0203824 A1 | 8/2010 | Chang et al. | |
| 2010/0227550 A1 | 9/2010 | Chang et al. | |
| 2011/0016280 A1 | 1/2011 | Chang et al. | |
| 2011/0034150 A1 | 2/2011 | Chang et al. | |
| 2011/0035682 A1 | 2/2011 | Chang et al. | |
| 2011/0138378 A1 | 6/2011 | Chang | |
| 2011/0167166 A1 | 7/2011 | Chang | |
| 2011/0167175 A1 | 7/2011 | Chang | |
| 2011/0211226 A1 | 9/2011 | Chang et al. | |
| 2011/0279829 A1 | 11/2011 | Chang et al. | |
| 2012/0096451 A1 | 4/2012 | Tenbarge et al. | |
| 2012/0230315 A1 | 9/2012 | Chang et al. | |
| 2012/0258700 A1 | 10/2012 | Chang et al. | |
| 2013/0095887 A1 | 4/2013 | Chang et al. | |
| 2013/0103775 A1 | 4/2013 | Chang et al. | |
| 2013/0104052 A1 | 4/2013 | Chang et al. | |
| 2013/0109353 A1 | 5/2013 | Chang et al. | |
| 2013/0111459 A1 | 5/2013 | Nakamoto | |
| 2014/0018130 A1 | 1/2014 | Chang | |
| 2014/0082604 A1 | 3/2014 | Chang et al. | |
| 2015/0356561 A1 | 12/2015 | Chang et al. | |
| 2015/0356564 A1 | 12/2015 | Chang et al. | |
| 2015/0356565 A1 | 12/2015 | Chang et al. | |
| 2015/0363763 A1 | 12/2015 | Chang et al. | |
| 2015/0381612 A1 | 12/2015 | Chang et al. | |
| 2016/0011836 A1 | 1/2016 | Chang et al. | |
| 2016/0174068 A1 | 6/2016 | Chang et al. | |
| 2016/0239232 A1 | 8/2016 | Chang et al. | |
| 2016/0239243 A1 | 8/2016 | Chang et al. | |
| 2016/0313974 A1 | 10/2016 | Chang et al. | |
| 2017/0039009 A1 | 2/2017 | Chang et al. | |
| 2017/0064746 A1 | 3/2017 | Chang et al. | |
| 2017/0075636 A1 | 3/2017 | Chang et al. | |
| 2017/0078521 A1 | 3/2017 | Chang et al. | |
| 2017/0185376 A1 | 6/2017 | Chang et al. | |
| 2017/0228202 A1 | 8/2017 | Chang et al. | |
| 2017/0242649 A1 | 8/2017 | Jarvis et al. | |
| 2017/0249116 A1 | 8/2017 | Chang et al. | |
| 2017/0277487 A1 | 9/2017 | Chang et al. | |
| 2017/0286027 A1 | 10/2017 | Chang et al. | |
| 2017/0364326 A1 | 12/2017 | Chang et al. | |
| 2018/0011667 A1 | 1/2018 | Chang et al. | |
| 2018/0024790 A1 | 1/2018 | Chang et al. | |
| 2018/0024791 A1 | 1/2018 | Chang et al. | |
| 2018/0039456 A1 | 2/2018 | Chang et al. | |
| 2018/0039459 A1 | 2/2018 | Chang et al. | |
| 2018/0041482 A1 | 2/2018 | Chang et al. | |
| 2018/0046418 A1 | 2/2018 | Chang et al. | |
| 2018/0203647 A1 | 7/2018 | Chang | |
| 2018/0203648 A1 | 7/2018 | Chang | |
| 2018/0253264 A1 | 9/2018 | Chang et al. | |
| 2018/0335989 A1 | 11/2018 | Chang et al. | |
| 2018/0364929 A9 | 12/2018 | Chang et al. | |
| 2019/0107980 A1 | 4/2019 | Chang et al. | |
| 2019/0121585 A1 | 4/2019 | Chang et al. | |
| 2019/0121613 A1 | 4/2019 | Chang et al. | |
| 2019/0250883 A1 | 8/2019 | Chang et al. | |
| 2019/0272148 A1 | 9/2019 | Chang et al. | |
| 2019/0303100 A1 | 10/2019 | Chang et al. | |
| 2019/0384547 A1 | 12/2019 | Chang et al. | |
| 2020/0097225 A1 | 3/2020 | Chang et al. | |
| 2020/0225889 A1 | 7/2020 | Chang et al. | |

(56) References Cited

U.S. PATENT DOCUMENTS

| | | | |
|---|---|---|---|
| 2021/0055891 | A1 | 2/2021 | Chang et al. |
| 2021/0165632 | A1 | 6/2021 | Chang et al. |

FOREIGN PATENT DOCUMENTS

| | | |
|---|---|---|
| EP | 0473987 | 3/1992 |
| EP | 1072976 A2 | 1/2001 |
| GB | 2357663 A | 6/2001 |
| WO | 95/26703 | 10/1995 |
| WO | 9843433 A1 | 10/1998 |
| WO | 0002358 A1 | 1/2000 |
| WO | 00/06904 | 2/2000 |
| WO | 0024192 A1 | 4/2000 |
| WO | 0044119 A1 | 7/2000 |
| WO | 0125870 | 4/2001 |
| WO | 0142894 A1 | 6/2001 |
| WO | WO0241118 A2 | 5/2002 |
| WO | 03/015641 | 2/2003 |
| WO | WO2004093149 A2 | 10/2004 |

OTHER PUBLICATIONS

WIPO (Ellen Moyse and Thomas C. Lee, authorized officers);International Preliminary Report on Patentablity and Written Opinion for PCT/US2004/011372; mailed Aug. 14, 2007; 8 pages. William Ho Chang is an inventor for both PCT/US2004/011372 and U.S. Appl. No. 10/734,481.
WIPO (Jason D. Cardone, authorized officer; International Search Report for PCT/US2003/039547; mailed Jul. 15, 2005; 4 pages. William Ho Chang is an inventor for both PCT/US2003/039547 and U.S. Appl. No. 10/734,481.
Wiener et al; "Meeting USB and IEEE1394 Overcurrent Protection Requirements Using PolySwitch Devices"; Wescon/97 Conference Proceedings; IEEE Nov. 1997; pp. 442-475.
Remple; "USB On-The-Go Interface for Portable Devices"; Consumer Electronics, ICCE 2003 IEEE International Conference; IEEE Jun. 2003; pp. 8-9.
Jankovec et al; "Analog Circuit Development System"; EUROCON 2003, Computer as a Tool, The IEEE Region 8; IEEE, Sep. 2003; vol. 1 pp. 125-129.
Haynie, Dave, "The Zorro III Bus Specification: A General Purpose Expansion Bus for High Performance Amiga Computers," Mar. 20, 1991, Revision 1.0, pp. 1-84.
David, Jon, "Security in a Flash," Computers & Security, Jan. 1, 2003, vol. 22, No. 1, pp. 29-33, Elsevier Science Publishers, Amsterdam, NL.
US Receiving Office, International Search Report regarding PCT Application No. PCT/US01/48057, Jan. 6, 2003, 1 page.
US Receiving Office, International Preliminary Examination Report regarding PCT Application No. PCT/ US01/48057, Aug. 24, 2004, 11 pages.
Attiaoui et al., "Conception of Data Base Management System in USB Smart Card Flash Memory: Application for the Cancer Pathology of Medical Information Systems," SETIT 2005: 3rd International Conference: Sciences of Electronic Technologies of Information and Telecommunications, Mar. 27-31, 2005, pp. 1-7.
Tahir et al., "Analysis of AutoPlay Feature via the USB Flash Drives," WCE 2008: Proceedings of the World Congress of Engineering, Jul. 2-4, 2008, pp. 1-4.
State Intellectual Property Office of the P.R.C., Office Action regarding Chinese Patent Application No. 200480016309.4, May 8, 2009, 10 pages.
European Patent Office, Office Action regarding European Patent Application No. 01985549.3, Oct. 26, 2010, 4 pages.
State Intellectual Property Office of the P.R.C., Office Action regarding Chinese Patent Application No. 200480016309.4, May 24, 2011, 11 pages.
State Intellectual Property Office of the P.R.C., Office Action regarding Chinese Patent Application No. 200480016309.4, Oct. 28, 2011, 6 pages.
European Patent Office, Office Action regarding European Patent Application No. 04759486.6, Dec. 23, 2011, 11 pages.
US Patent and Trademark Office; Office Action for U.S. Appl. No. 10/823,513; Feb. 8, 2007; 15 pages.
USPTO; Office Action for U.S. Appl. No. 10/823,513; Oct 31, 2007; 22 pages.
USPTO; Office Action for U.S. Appl. No. 10/823,513; Dec. 29, 2008; 21 pages.
USPTO; Office Action for U.S. Appl. No. 10/823,513; Dec. 17, 2009; 22 pages.
USPTO; Notice of Allowance for U.S. Appl. No. 10/823,513; Jun, 1, 2010; 10 pages.
USPTO; Notice of Allowance for U.S. Appl. No. 12/890,847; Jun. 20, 2012; 10 pages.
USPTO; Notice of Allowance for U.S. Appl. No. 12/891,594; Jan. 18, 2013; 11 pages.
USPTO; Office Action for U.S. Appl. No. 10/734,848; Sep. 2, 2008; 31 pages.
USPTO; Notice of Allowance for U.S. Appl. No. 10/734,848; Oct. 28, 2010; 20 pages.
Tahir et al., "Analysis of Autoplay Feature via the USB Flash Drives", Proceedings of the World Congress on Engineering, Jul. 2-4, 2008, vol. I, pp. 1-4.
Jebarajan et al., "A Method for Designing a Operating System for Plug and Play Bootstrap Loader USB Drive", International Journal of Computer Science, Jan. 2011, vol. 8, Issue 1, pp. 295-301.
US Patent and Trademark Office, Office Action regarding U.S. Appl. No. 13/047,672, Jan. 20, 2012, 58 pages.
US Patent and Trademark Office, Office Action regarding U.S. Appl. No. 13/047,674, Mar. 14, 2012, 38 pages.
US Patent and Trademark Office, Office Action regarding U.S. Appl. No. 12/891,594, Jul. 5, 2012, 56 pages.
US Patent and Trademark Office, Office Action regarding U.S. Appl. No. 13/047,672, Nov. 6, 2012, 34 pages.
US Patent and Trademark Office, Notice of Allowance regarding U.S. Appl. No. 13/047,674, Nov. 6, 2012, 22 pages.
U.S. Patent and Trademark Office, Notice of Allowance for U.S. Appl. No. 13/047,672, Dec. 24, 2013, 21 pages.
U.S. Patent and Trademark Office; Office Action regarding U.S. Appl. No. 14/021,974; mailing date Nov. 22, 2013; 16 pages.
U.S. Patent and Trademark Office; Office Action regarding U.S. Appl. No. 13/047,672; mailing date Aug. 1, 2013; 25 pages.
European Patent Office, Office Action for European Patent Application No. 04759486.6, Mar. 14, 2014, 3 pages.
Ray Geroski, Take your data anywhere with these four USB miniature storage devices, Sep. 23, 2002, 6 pages.
Ed Roth, Storage in a Flash, Dec. 15, 2002, 4 pages.
M-Systems Inc., Mobile DiskOnChip Plus 32/64MByte, Flash Disk with Protection and Security-Enabling Features, 2002, 50 pages.
State Intellectual Property Office of the P.R.C., Office Action for Chinese Patent Application No. 200480016309.4, Aug. 5, 2013, 18 pages.
European Patent Office, Office Action for European Patent Application No. 04759486.6, Jan. 8, 2014, 14 pages.
U.S. Patent and Trademark Office, Office Action for U.S. Appl. No. 10/734,484, Sep. 2, 2008, 44 pages.
U.S. Patent and Trademark Office, Notice of Allowance for U.S. Appl. No. 10/734,484, Oct. 28, 2010, 57 pages.
U.S. Patent and Trademark Office, Notice of Allowance for U.S. Appl. No. 12/890,487, Jun. 20, 2012, 10 pages.
U.S. Patent and Trademark Office, Notice of Allowance for U.S. Appl. No. 12/891,594, Jul. 22, 2013, 26 pages.
U.S. Patent and Trademark Office, Office Action for U.S. Appl. No. 14/021,974, May 16, 2014, 47 pages.
U.S. Patent and Trademark Office, Office Action for U.S. Appl. No. 13/047,672, Jun. 25, 2014, 30 pages.
U.S. Patent and Trademark Office, Notice of Allowance for U.S. Appl. No. 13/047,674, Apr. 29, 2013, 15 pages.

(56) References Cited

OTHER PUBLICATIONS

State Intellectual Property Office of the P.R.C., Office Action Regarding Chinese Patent Application No. 200480016309.4, Apr. 3, 2014, 14 pages.
European Patent Office, Office Action for European Patent Application No. 04759486.6, May 22, 2014, 43 pages.
United States Patent and Trademark Office, Office Action for U.S. Appl. No. 14/021,974, dated Sep. 9, 2014, 17 pages.
United States Patent and Trademark Office, Office Action for U.S. Appl. No. 14/089,622, dated Oct. 6, 2014, 101 pages.
United States Patent and Trademark Office, Notice of Allowance for U.S. Appl. No. 13/047,672, dated Oct. 17, 2014, 33 pages.
State Intellectual Property Office of the P.R.C., Office Action Regarding Chinese Patent Application No. 200480016309.4, dated Sep. 29, 2014, 17 pages.
U.S. Patent and Trademark Office, Notice of Allowance for U.S. Appl. No. 14/021,974, dated Dec. 19, 2014, 24 pages.
Herman D'Hooge, The Communicating PC, Apr. 1996, 7 pages, IEEE Communication Magazine.
Tony K.P. Wong, An Embedded Chip for USB Application: from the Architecture to Implementation, 1999, 10 pages, International IC.
E. V. Vetvitskii et al., Use of the USB Universal Serial Bus in Computer Medical Systems, 2000, 6 pages, vol. 34, No. 4, Biomedical Engineering.
U.S. Patent and Trademark Office, Notice of Allowance for U.S. Appl. No. 14/089,622, dated Mar. 24, 2015, 44 pages.
United States Patent and Trademark Office, Supplemental Notice of Allowability for U.S. Appl. No. 14/089,622, dated Apr. 29, 2015, 16 pages.
Office Action prepared by the U.S. Patent and Trademark Office for U.S. Appl. No. 14/835,585, dated Oct. 4, 2018, 33 pages.
Office Action prepared by the U.S. Patent and Trademark Office for U.S. Appl. No. 15/042,051, dated Sep. 28, 2018, 14 pages.
U.S. Patent and Trademark Office, Office Action Regarding U.S. Appl. No. 15/042,051; dated Dec. 28, 2017; 58 pages.
U.S. Patent and Trademark Office, Office Action Regarding U.S. Appl. No. 15/042,044; dated Jan. 11, 2018; 55 pages.
U.S. Patent and Trademark Office, Office Action Regarding U.S. Appl. No. 14/835,585; dated Mar. 20, 2018; 96 pages.
Office Action prepared by the U.S. Patent and Trademark Office for U.S. Appl. No. 14/835,585, dated Feb. 14, 2019, 37 pages.
Notice of Allowance prepared by the U.S. Patent and Trademark Office for U.S. Appl. No. 15/042,051, dated Feb. 26, 2019, 68 pages.
Office Action prepared by the U.S. Patent and Trademark Office for U.S. Appl. No. 15/042,044, dated Jul. 20, 2020, 22 pages.
Final Office Action prepared by the U.S. Patent and Trademark Office for U.S. Appl. No. 14/835,585, dated Aug. 22, 2019, 47 pages.
Office Action prepared by the U.S. Patent and Trademark Office for U.S. Appl. No. 14/835,585, dated Jun. 5, 2020, 65 pages.
Office Action prepared by the U.S. Patent and Trademark Office for U.S. Appl. No. 16/518,727, dated May 15, 2020, 56 pages.
Office Action prepared by the United States Patent and Trademark Office for U.S. Appl. No. 15/042,044, dated Jan. 19, 2021, 21 pages.
Notice of Allowance prepared by the U.S. Patent and Trademark Office for U.S. Appl. No. 16/518,727, dated Nov. 6, 2020, 65 pages.
Corrected Notice of Allowability prepared by the U.S. Patent and Trademark Office for U.S. Appl. No. 16/518,727, dated Mar. 1, 2021, 9 pages.
Kindberg et al., "A Web Based Nomadic Computing System", HP Laboratories, Palo Alto, CA; Aug. 24, 2000, 14 pages.
Bluetooth, Core, "Specification of the Bluetooth System," Dec. 1, 1999, 1080 pages (attachments are in 4 parts).
"Part 11 Wireless LAN Medium Access Control (MAC) and Physical Layer (PHY) Specifications," ANSI/IEEE Std. 802.11, 1999 Edition, 528 pages (attachments are in 2 parts).
Richard III, Golden G., "Service Advertisement and Discovery: Enabling Universal Device Cooperation" (IEEE Internet Computing Magazine, Sep./Oct. 2000), 9 pages.
Excerpts from Gerard O'Driscoll, The Essential Guide to Home Networking (Published 2000/ Reprinted 2001), 25 pages.
Axis Print Server Brochure (archived on Sep. 25, 2000, available at https://web.archive.org/web/20000925114525/http://www.axis.com/ftp/pub/axis/data_sheets/npsds.pdf), 4 pages.
Excerpts from UPnP Forum Connections Newsletter, Third Quarter 2000 (archived on Aug. 16, 2000, available at https://web.archive.org/web/20000816073400/http://upnp.org/newsletter/default.htm, https://web.archive.org/web/20000818105427/http://www.upnp.org/newsletter/devtools.htm), 6 pages.
Excerpts from Bluetooth Core Specification v1.0 B (Dec. 1, 1999), 60 pages.
Excerpts from Roy Hoffman, Data Compression in Digital Systems (1997), 189 pages.
Excerpts from Michael Miller, The Complete Idiot's Guide to Home Theater Systems (2000), 58 pages.
Awduche, Daniel O. "On Resource Discovery Systems with Mobile Hosts" (1996), 6 pages.
IEEE Standard for Information Technology—Transport Independent Printer/System Interface (TIP/SI) (1997), 124 pages.
Macintosh PowerBook User's Manual (1998), 94 pages.
Setting Up Your PowerBook (2000), 80 pages.
Wright, "Design Goals for an Internet Printing Protocol," Apr. 1999, 43 pages.
Office Action prepared by the United States Patent and Trademark Office for U.S. Appl. No. 15/042,044, dated Jun. 24, 2021, 28 pages.
United States Patent and Trademark Office; Office Action dated Aug. 5, 2022 for U.S. Appl. No. 15/042,044; 27 pages.

\* cited by examiner

PORTABLE USB DEVICE FOR INTERNET ACCESS SERVICE

CROSS-REFERENCE TO RELATED APPLICATIONS

This application claims priority to U.S. Provisional Patent Application Ser. No. 60/433,196, file Dec. 12,2002, the entire disclosure of which is incorporated Herein by reference for all purposes.

BACKGROUND AND SUMMARY OF THE INVENTION

Present invention relates to a communication device and a method of using it to enable wireless communication between computing devices.

As an example to demonstrate the functionalities and advantages of the communication device of present invention, printing support for wireless mobile devices (e.g. laptops, PDAs, mobile phones) will be described.

Most handheld devices (PDAs, mobile phones) today do not have printing support due to their low processing power and the lack of appropriate printer drivers. One current method of printing wirelessly from mobile devices such as PDAs or mobile phones requires that a user first install an appropriate printer driver corresponding to a device specific printer. One driver is required for each printer. However, most printer drivers are unavailable for operating systems that run on PDAs and mobile phones. Furthermore, it is difficult and burdensome for a user to install a new printer driver each time printing is attempted at a different printer. Also, to print wirelessly, the printer needs to be wireless-enabled. Most printers today are not wireless-enabled. Therefore, users of handheld device rely mainly on "synching" their devices with PCs to print. However, "synching" could be difficult when a user is traveling or "on the go." Concerns over security, privacy, and complications in installation processes discourage mobile users from synching with PCs in a business lounge, hotel business center, conference center or another person's office.

Wireless communication standards such as WiFi and Bluetooth "cut the wire", allowing the transfer of files between computing devices. Currently, however, privacy and security concerns dictate that a first computing device sending, transferring, or retrieving file or data wirelessly to and from a second computing device (e.g. to its hard drive) requires that the user of the second computing device respond with an accept or reject command each time (e.g. through a user interface). This current method or process sacrifices the ease of use for wireless devices to safeguard security.

Another difficulty in using wireless communication today is that a user is expected to have technical knowledge of the installation and configuration of the wireless hardware and software (e.g., adapters, dongles, drivers, protocol stacks), and related security settings. The communication device of present invention significantly simplifies the configuration of wireless communications, making it much easier to use.

A communication device of present invention includes a structural, external interface (e.g., a USB interface) for connecting to a computing device, a wireless interface for making a wireless connection to a second computing device, and a memory or storage component for storing and embedding software for a variety of applications. The present invention provides wireless printing without the need to install a device specific printer driver each time at each new location for printing. Moreover, the invention enables wireless printing to any printer—not just to wireless printers. Furthermore, the present invention improves the above processes without compromising security or privacy. The present invention enables transferring of files and data wirelessly from one device to another and improves ease of use.

The communication device of present invention can be connected to a first computing device (e.g., a personal computer or PC) to enable instant wireless communication with a second computing device. No driver or software installation is needed in the first computing device. All software components required to enable the wireless communication are embedded in the communication device itself and can be automatically launched, installed and execute such as through an AutoRun process in the first computing device.

In addition, the embedded software components in the communication device can automatically uninstall or delete applications or data when the communication device is unplugged from the external port such as the USB or FireWire port. No data from the second computing device or from the communication device will be retained in the first computing device after the communication device is disconnected from the first device, thus enhancing privacy and security.

The present invention further allows a computing device to wirelessly provide services to other computing devices. As an examples of such a service, a PC can provide printing or data display services to a mobile computing device (e.g., a mobile computer, digital telephone, or digital camera). For example, a user of the mobile computing device can simply plug the communication device (e.g., size of an adapter or dongle) into a USB interface or port of the PC. The user can then instantly send a document or data over a wireless connection, through the communication device and to a printer connected to the PC, all directly from the mobile device. After the printing process has been completed, the communication device is unplugged from the PC and no data is retained by the PC. No printer driver installation is needed in the mobile device and the user can print to any printer that is connected to the PC. In addition, the printer need not be a wireless printer.

The wireless communication device of the present invention provides numerous advantages and functionalities.

Printing documents from mobile devices is made easy. Present communication device simplifies the user experience of data output from a mobile device. A user only needs to connect the communication device to a desktop PC or laptop or other computing device (e.g. through USB port). An embedded application in the communication device may be automatically launch in the PC. The user launches a client application on the mobile device (e.g. PDA, mobile phone, digital camera etc) can automatically recognizes the service (e.g., printing) enabled by the communication device of present invention. The user just needs to select the document to be printed and the document is printed to a selected printer associated with the PC. Thus, wireless communication device of this invention simplifies the process of getting a print from the mobile device.

The communication device includes embedded software components that automate configuration of wireless connectivity. The present communication device automates the process of configuring the hardware (e.g. installation, un-installation), thus making wireless connectivity easy to use for non-technical users.

Present communication device can be used as an external disk drive. The present communication device is unique since it may also include storage or memory (e.g. flash Memory) that could cache or store data, in addition to the wireless communication capability. The memory component may be segmented into one or more logical segments such as a public area and a private area. The public area for example can be reserved for a user to save and retrieve data or files when the communication device is plug into a PC or laptop. In this case, the communication device is used as an external disk storage drive that a user can easily carry along with him.

The present communication device simplifies sending and retrieving of wireless data from one device another, and makes it easer to use and without compromising privacy and or security. Prior art methods requires user consent or permission from a second party before a first party could send or retrieve data wirelessly to or from the computing device of the second party. The present invention eliminates this requirement without sacrificing privacy and or security.

The present communication device could uniquely be used as a channel for distributing software products. The present invention ties-up the software functionality inside a communication device thus making it more difficult for software piracy or cloning of software comparing to other distribution channels such as CD.

The present communication device can be configured to retrieve data from only the second computing device (e.g. mobile device) of a selected mobile user, thus eliminating the risk of a third device accidentally retrieving data from the first computing device when the communication device is plugged into the first communication device.

No data is retained by the computing device where the communication device is connected. In the aforementioned printing scenario, if the user is using another person's desktop for printing, the user must be sure that no document or data is accidentally left on the desktop. When using another person's PC there is always concern that a confidential document could be left on the PC. In the present invention, one or more software components embedded in the device ensure that no data relating to the output of the digital document is retained by the computing device.

The communication device of present invention can include an optional battery. This enables the communication device to function on its own, without the need to be connected to a PC to draw power. Therefore, a mobile device can send and or retrieve files or data wirelessly to and from the memory component of the communication device directly anywhere (e.g., wireless device in the pocket of the user) without the need to plug the communication device to a PC for usage.

Printing is used as an example to illustrate the advantages of the communication device of present invention. It in no way constrains the scope of the invention. The communication device can embed different programs to provide a variety of functionalities through wireless communications between multiple computing devices such as display, presentation of data, secure wireless data transfer, games, instant messaging, internet access among others as it will be evident by one skilled in the art after a reading of the disclosure and its accompanied drawings.

Additional description and implementations of the present invention will be apparent from the detailed description of the preferred embodiment thereof, which proceeds with reference to the accompanying drawings.

BRIEF DESCRIPTIONS OF THE DRAWINGS

Figure 8:
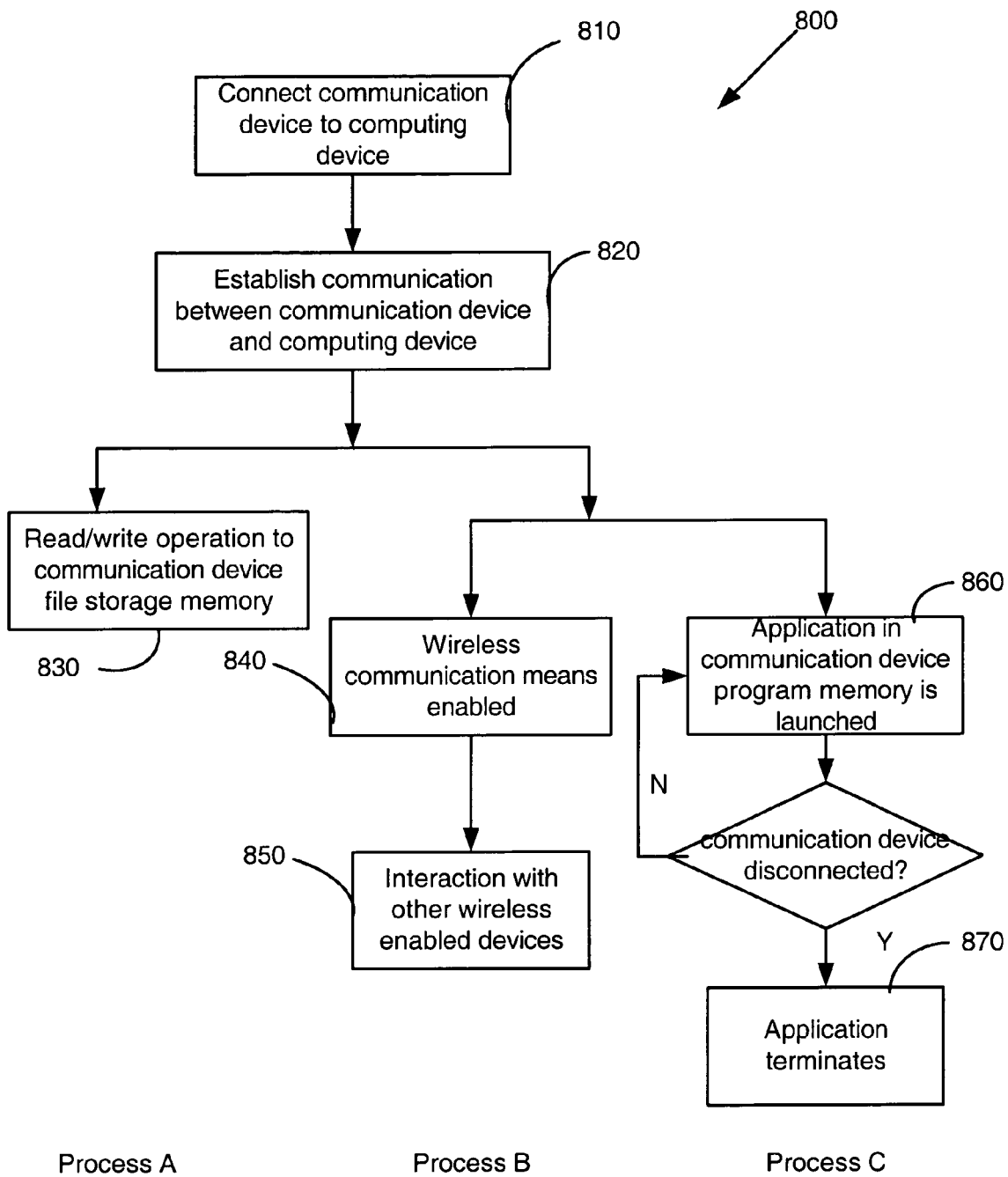

FIG. 8. is a flow diagram of another exemplary method or process of using the communication device of the present invention.

Figure 9:
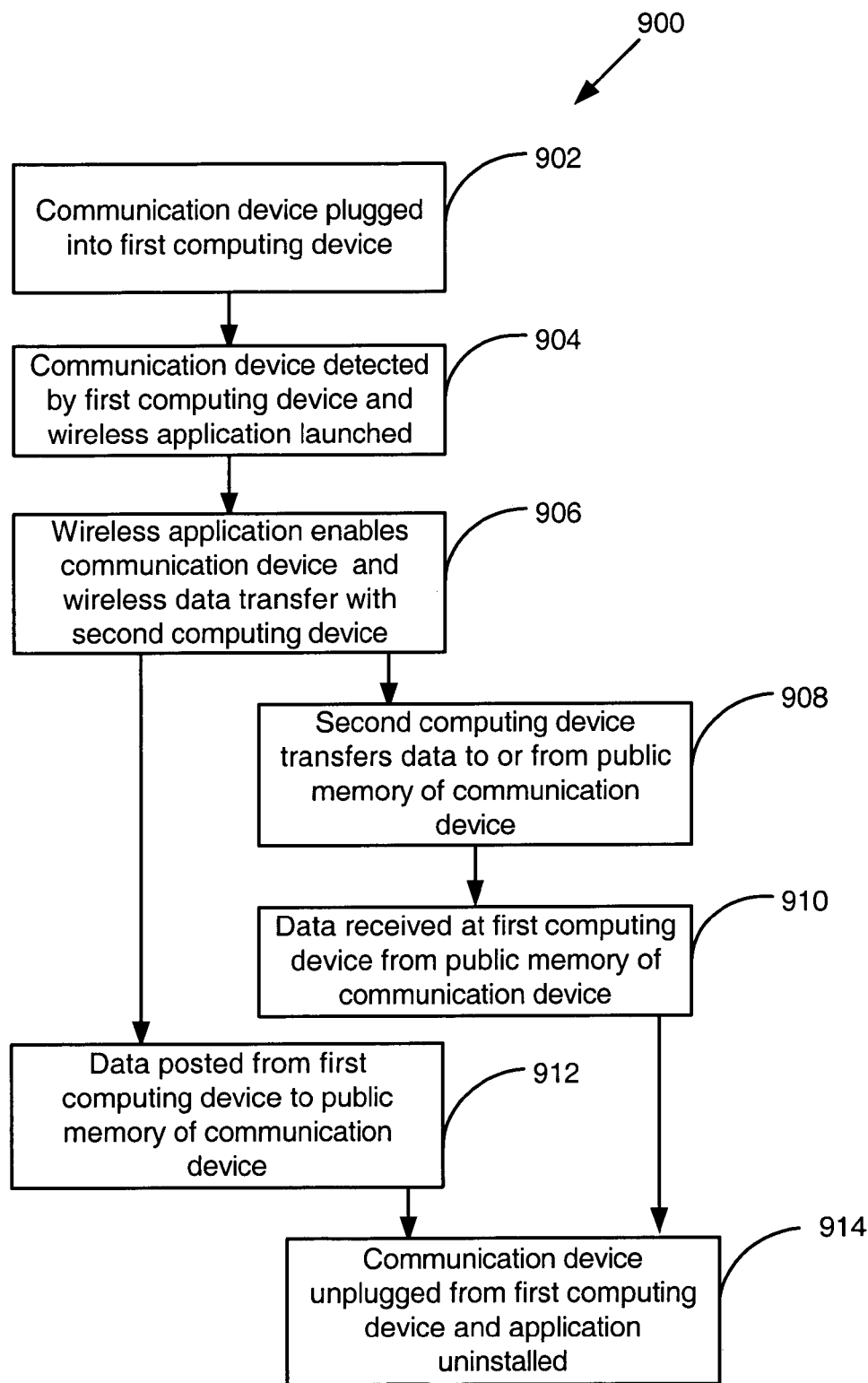

FIG. 9 is a flow diagram of a wireless communication process that maintains security and privacy without requiring users to manually accept or reject actions.

Figure 10:
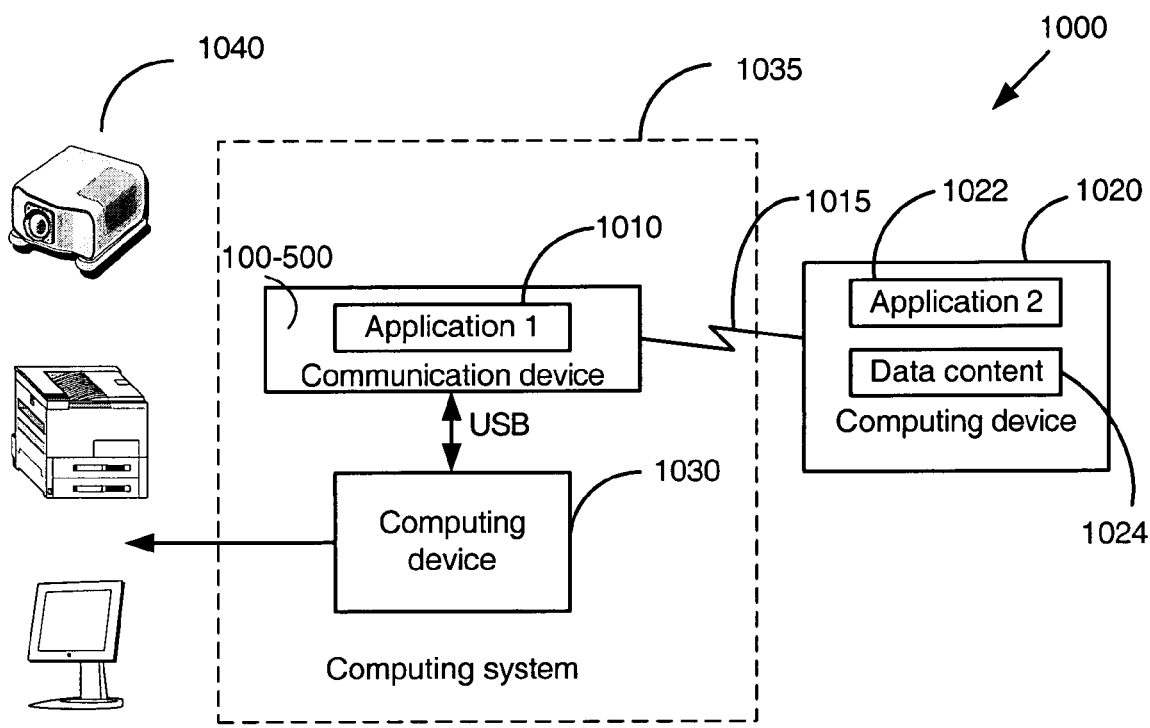

FIG. 10 is a block diagram illustrating a system where the communication device is used to enable output of data content from a computing device to one or more output devices.

Figure 11:
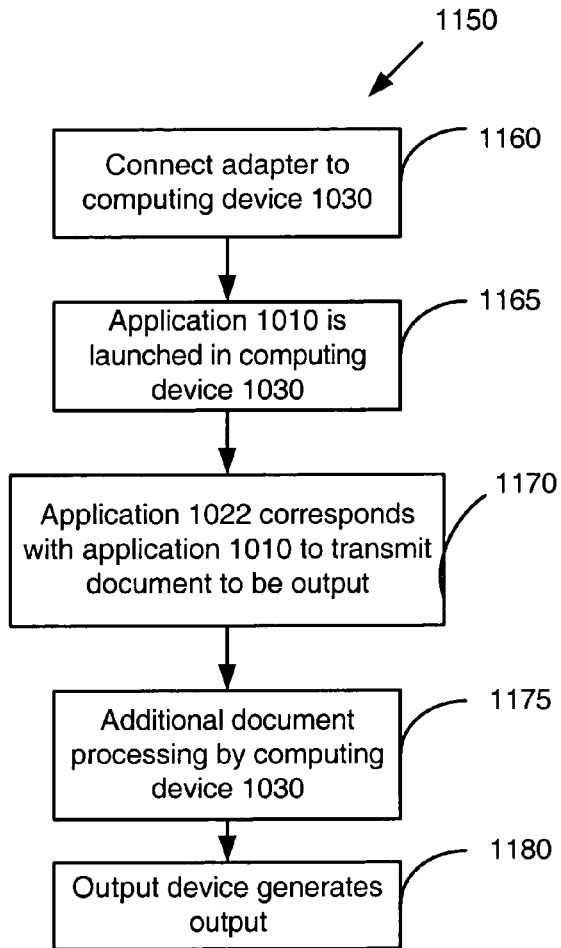

FIG. 11 is a flow diagram for an exemplary data output process (e.g., printing) using the system configuration as shown in FIG. 10.

Figure 12:
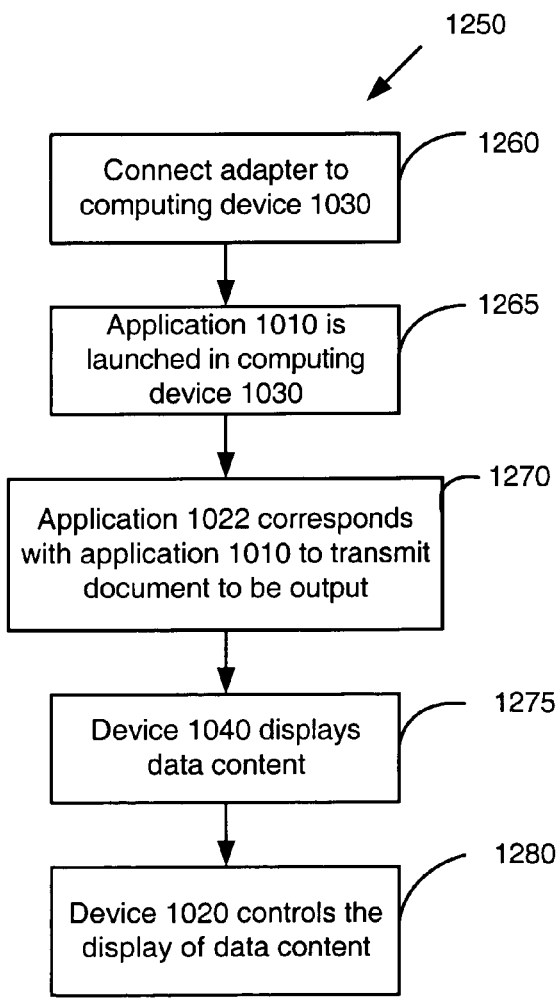

FIG. 12 illustrates a flow diagram for another exemplary data output process (e.g. presenting) using the system configuration as shown in FIG. 10.

Figure 13:
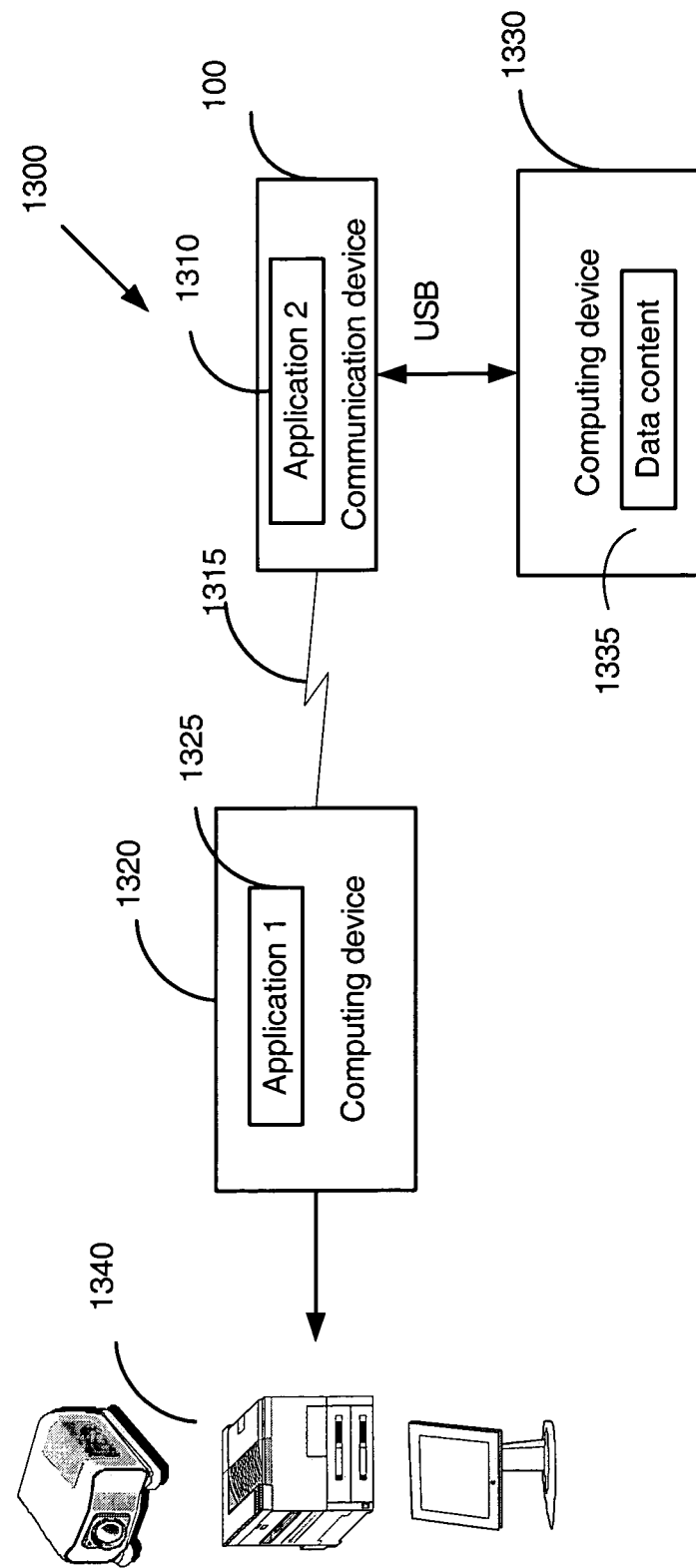

FIG. 13 is a block diagram illustrating another system in which the communication device is used to enable output of digital document from a computing device.

Figure 14:
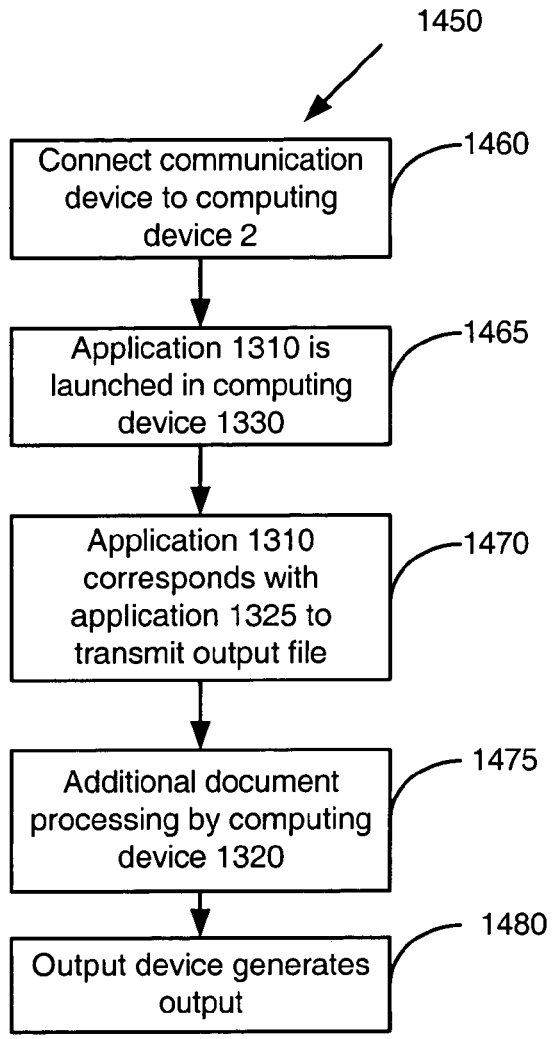

FIG. 14 is a flow diagram showing an exemplary process of the present invention for wireless output of data content using the system shown in FIG. 13.

Figure 15:
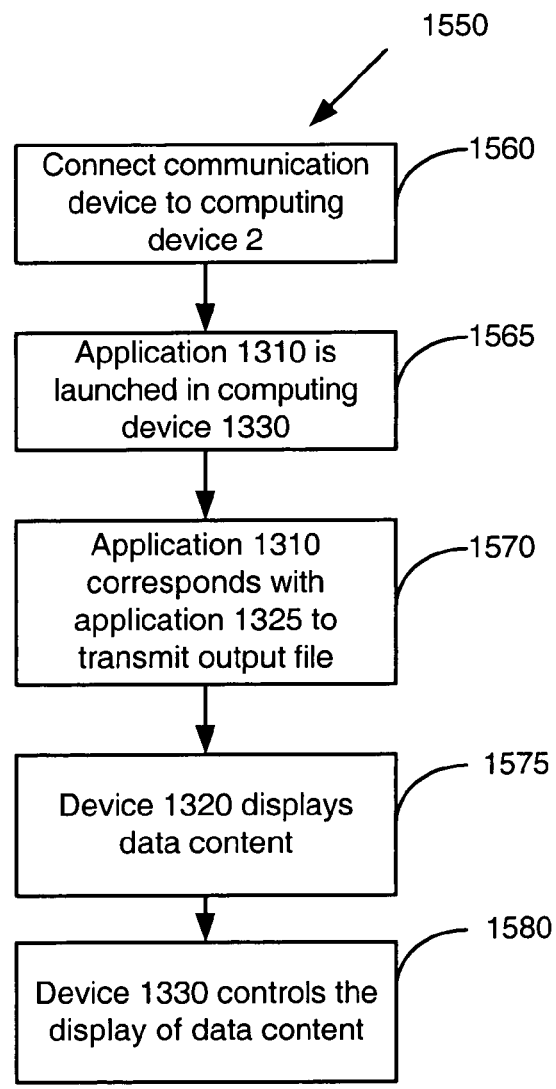

FIG. 15 is a flow diagram showing another exemplary process of the present invention for wireless display of data content using the system shown in FIG. 13.

Figure 16:
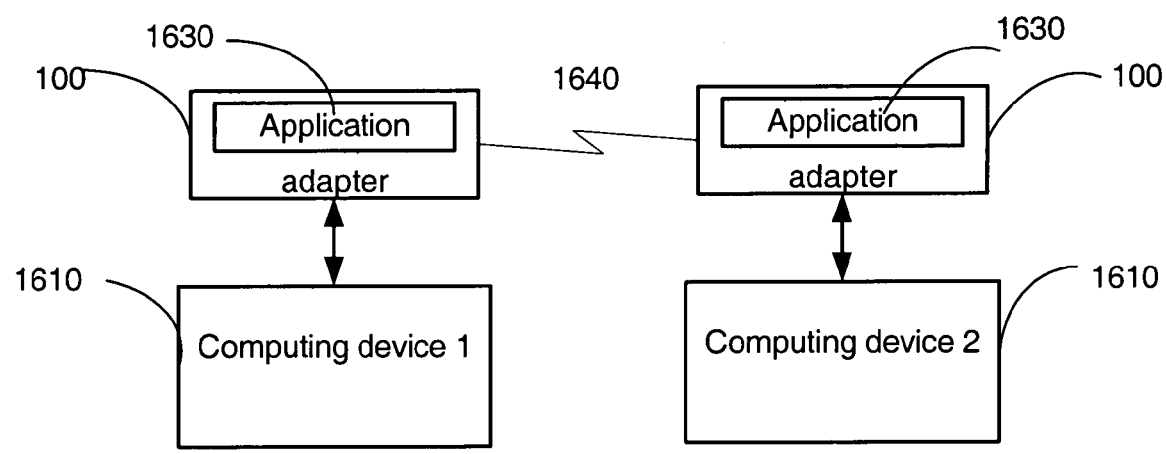

FIG. 16 is a block diagram illustrating another system where the communication device is used to enable wireless device-to-device communication (e.g. messaging).

DETAILED DESCRIPTION OF PREFERRED EMBODIMENT

Figure 1:
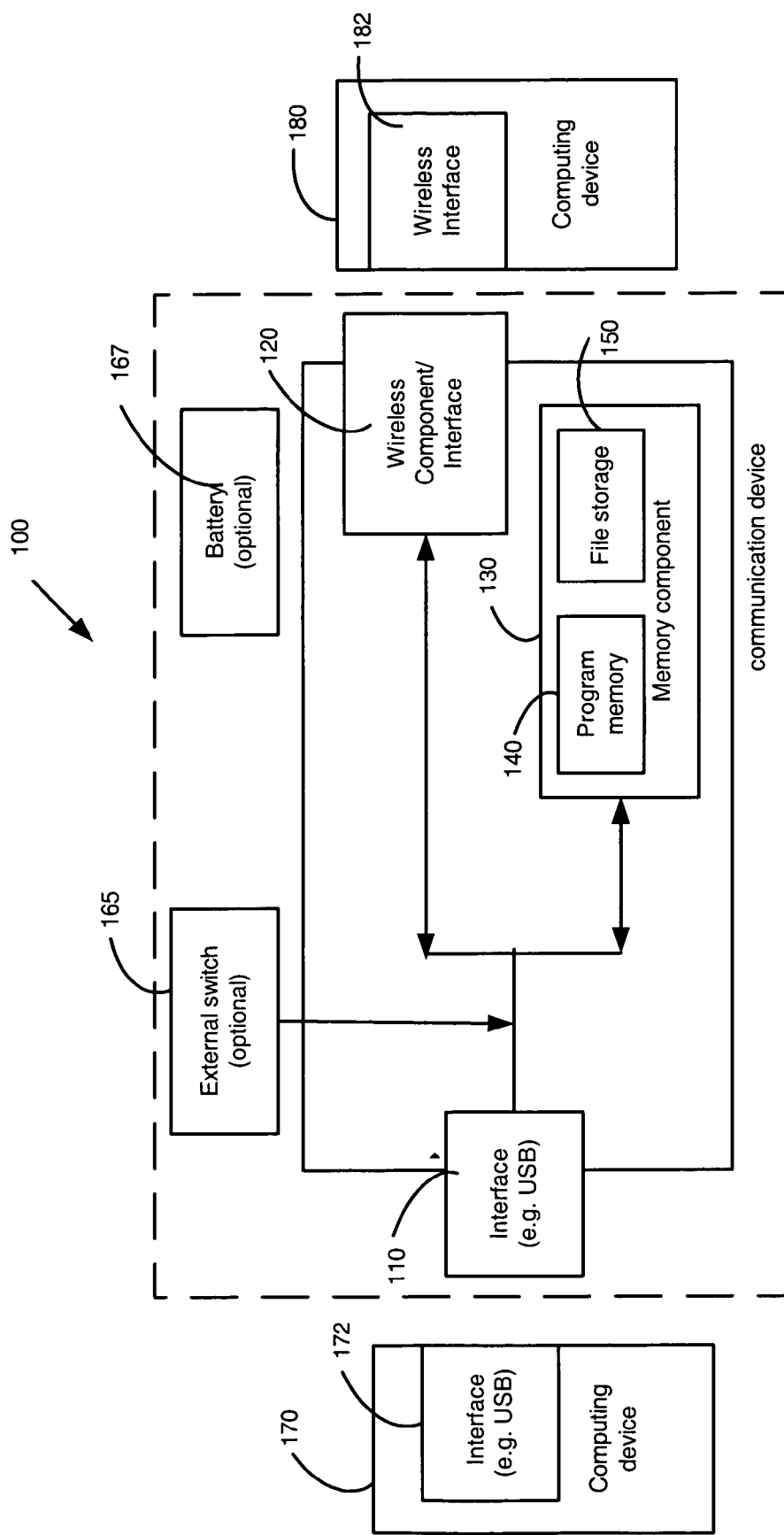
FIGS. 1-5 are block diagrams of embodiments of a communication device of the present invention.

FIG. 1 is a block diagram of one embodiment of a communication device 100 of the present invention. The communication device 100 includes a structural interface 110, such as USB (universal serial bus) interface, and a wireless component interface 120. Interface 110 can be any structural interface including, but not limited to, USB, FireWire (IEEE 1394), CF (compact flash), SD (secure digital), parallel, serial, among others, that enables device 100 to plug into a computing device 170. The wireless interface 120 may be implemented using any wireless— medium such as infrared or radio communication according to any protocol including but not limited to Bluetooth, IEEE 802.11a, IEEE 802b(WiFi), IEEE 802.11ab, IEEE 802.11g, IEEE 802.11f, IEEE 802.15, IEEE 802.17, ZigBee among others.

The communication device 100 includes a memory component 130 that may include volatile memory (e.g., ROM, RAM) and or non-volatile memory (e.g., flash memory, hard disk). One or more software components or applications (not shown) may be stored in the memory component 130. The software components or applications stored in the memory component 130 may include programs or functionalities that enable device 100 to "auto run" or "auto play" so that, when the communication device 100 is connected with interface 110 to a computing device 170, the program or software application will be automatically installed, launched and executed in the computing device 170, as will be described in detail below. The memory component 130 may include a program memory segment 140 and an optional separate file memory segment 150. Programs or software applications can be stored or embedded in the program memory 140. The software programs or applications may or may not be viewed or edited (e.g., added, deleted or changed) by a user. Hence program memory segment 140 can be implemented as a private or secure section of the memory component 130.

As an optional feature, file memory segment 150 may provide for additional file or data storage, run time buffering of data, or caching of data and files for faster access. The file storage component 150 is an example of an implementation of such memory segmentation. This component 150 may be optional and may or may not exist depending on implementation. Files and data stored in the file storage memory component 150 typically can be saved, retrieved, viewed or edited by a user through a computing device. As an example, the communication device 100 can be used as an external disk drive (e.g., "Flash drive") that a user can access and use as separate data storage drive when device 100 is plugged into the computing device 170.

The communication device 100 may include an optional external control switch 165, which can be used to activate, deactivate, control or adjust one or more functions provided by the device. The communication device 100 may also include an interface or status indicator (not shown) such as an LCD displaying text or image, lights or sound for status indication.

As is known in the art, wireless interface 120 may include a radio, a baseband controller and separate internal memory (not shown). The separate internal memory, implemented with Flash, RAM and or ROM circuitry, can store instructions and data required for proper functioning of the wireless component 120, such as a wireless protocol stack. Wireless component interface 120 may include a internal processor (not shown) that implements the instructions and logic for complying with wireless protocols ( e.g. Bluetooth or IEEE 80211, a,b,g,f, among others), in addition to managing the radio and the baseband of the wireless component interface 120.

Computing device 170 (e.g. PC, laptop, server) includes at least one structural interface 172 to which interface 110 of communication device 100 is connectable. In a typical implementation, structural interface 172 is a USB interface, however other interfaces such as parallel, serial, Firewire (IEEE 1394 a, 1394 b), CF (compact flash), SD (secure digital), Ethernet or wireless interfaces can also be implemented. To simplify the following description of the invention, interfaces 110 and 172 will be referred to a USB interfaces. It will be appreciated, however, that interfaces 110 and 172 could alternatively be implemented with any other interface format.

A computing device 180 (e.g., PC, laptop, server, PDAs such pocket PC, Palm, Symbian, Java or Linux cell phones, digital cameras, etc.) includes a wireless interface 182. The communication device 100 can communicate with the computing device 180 via wireless interface 120. Examples of wireless interface 120 that can be implemented include Bluetooth, IrDa, ZigBee, IEEE802.11 A, B, F and G, among others.

Figure 2:
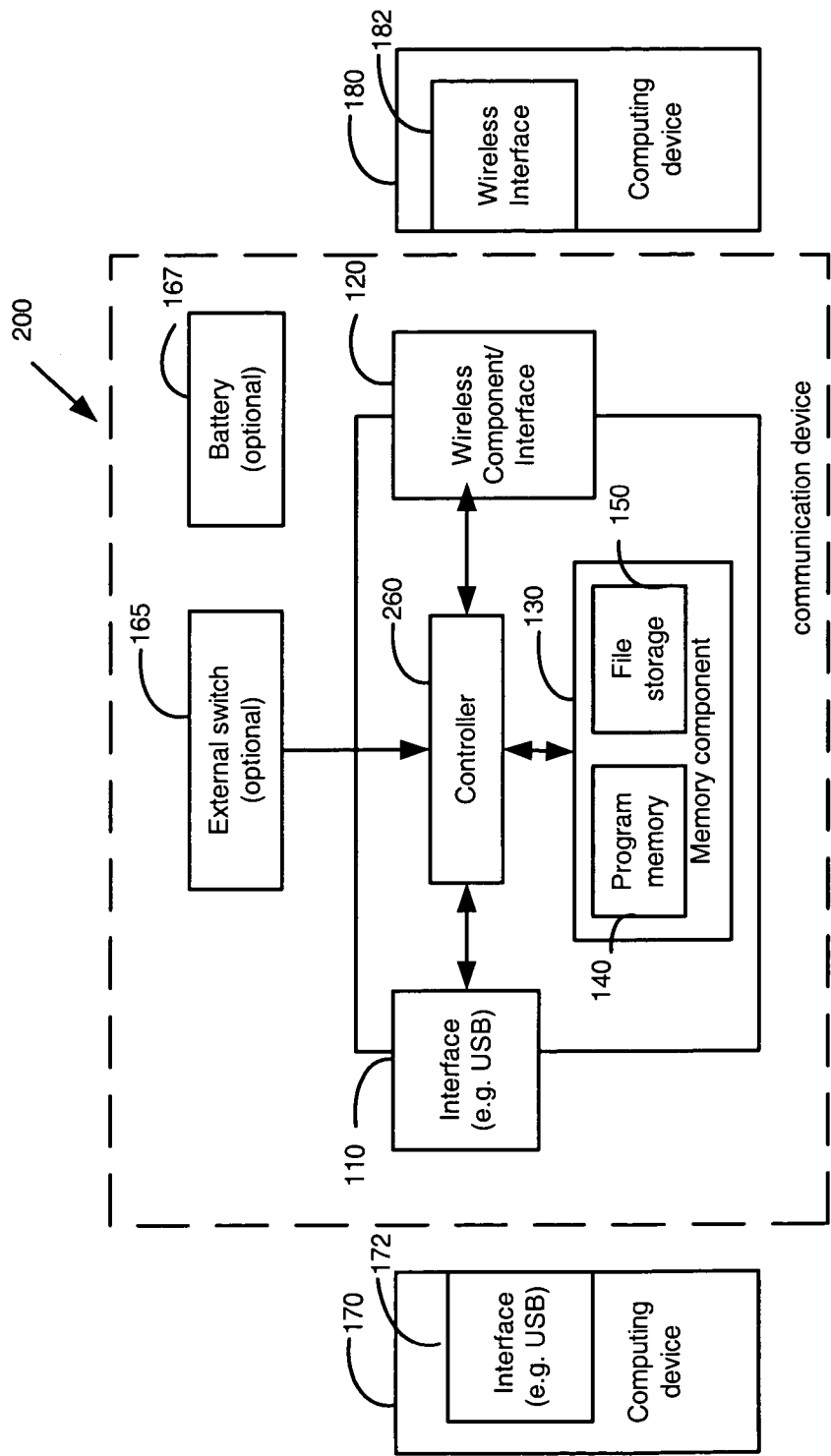

FIG. 2 is a block diagram of another embodiment of a communication device 200 of the present invention. Elements of the communication device 200 that are common to or the same as elements of communication device 100 are indicated by the same reference numerals. In addition, the communication device 200 includes a controller 260, which may comprise of a microprocessor. Other implementations of the controller 260 are and may include a digital signal processor (DSP), a system-on-a-chip (SOC), FPGL, ASIC etc. In this implementation, the memory component 130 may also store programs to be executed by the controller 260. Examples of functionality and components operable by controller 160 may include any combination below and are not limited to:

A communication protocol stack component (e.g., USB interface or Bluetooth stack, data or format conversion).

Communication and or security management software (e.g., protocol encoding/decoding, encryption/decryption, and authentication).

Control modules and components for managing the radio and baseband component of wireless interface 120.

AutoRun components that provide and control automatic installation and launching on the computing device 170 of one or more programs stored in 140 when the device 100 is plugged into computing device 170.

Control and management of the structural interface 110 e.g. USB, FireWire etc).

The controller 260 may or may not include an operating system. An advantage of the implementation of communication device 200 in FIG. 2 is that it may have a reduced chip count or hardware component cost compared to some implementations. For example, the functionalities of multiple components of a communication device of this invention may be implemented and managed with a single processor in the controller 260, rather than employing multiple controller/processor implementations.

Figure 3:
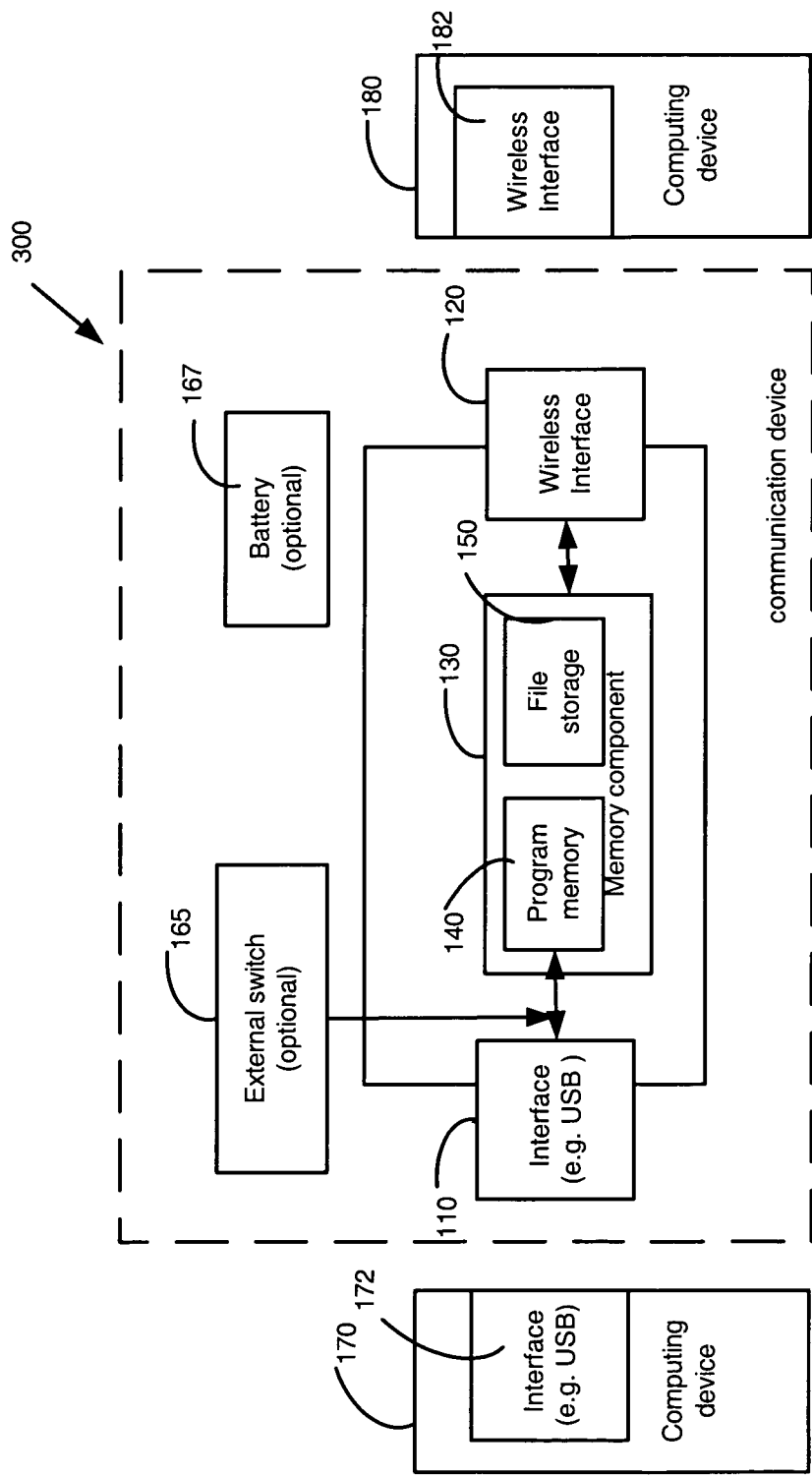

FIG. 3 is a block diagram of another embodiment of a communication device 300 of the present invention. Elements of the communication device 300 that are common to or the same as elements of communication device 100 are indicated by the same reference numerals. In FIG. 3, the memory component 130 acts and may include a hub for the wireless interface 120. Memory component 130 may include a controller or processor (not shown). In FIG. 1, the wireless interface 120 and memory component 130 are connected to the USB interface 110.

As discussed, memory component 140 can be implemented depending on the application. All above features and requirements can be implemented in a single memory component 130, segmented in to two components 140 and 150, or segmented into three components 144,146, and 150 as illustrated in FIGS. 4 and 5.

FIGS. 1-3 show memory component 130 segmented into two sections, private section or program section 140 and public section or file storage section 150. The public file storage component 150 corresponds to memory that can be accessed by the end-user. This optional component 150 allows a user to save and retrieve data when device 100 is plugged into the USB interface of computing device 170. This public memory section 150 (e.g., flash) can also be exposed for public wireless access. Program memory section 140 is private and end user cannot access it.

Figure 4:
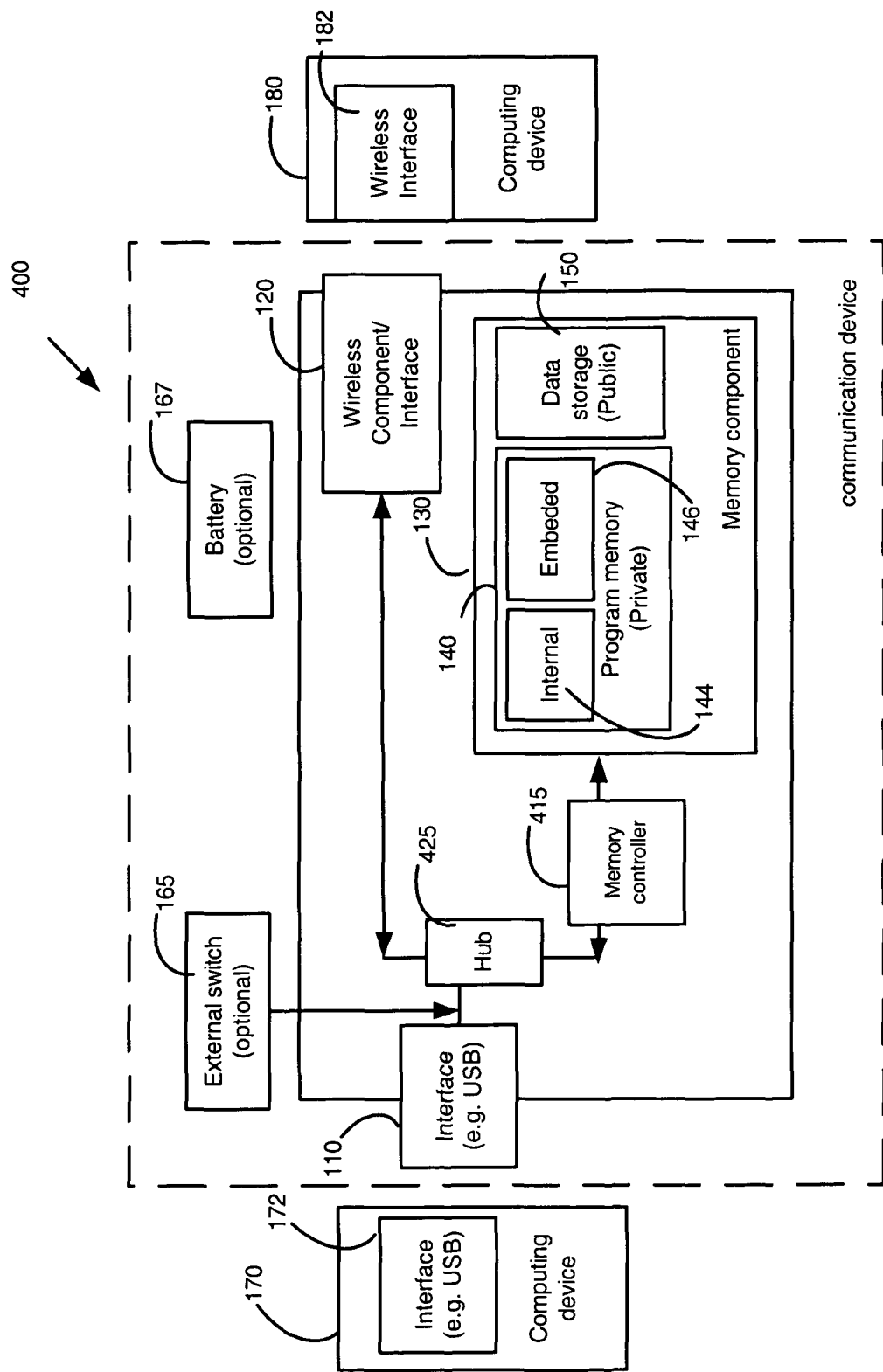
Figure 5:
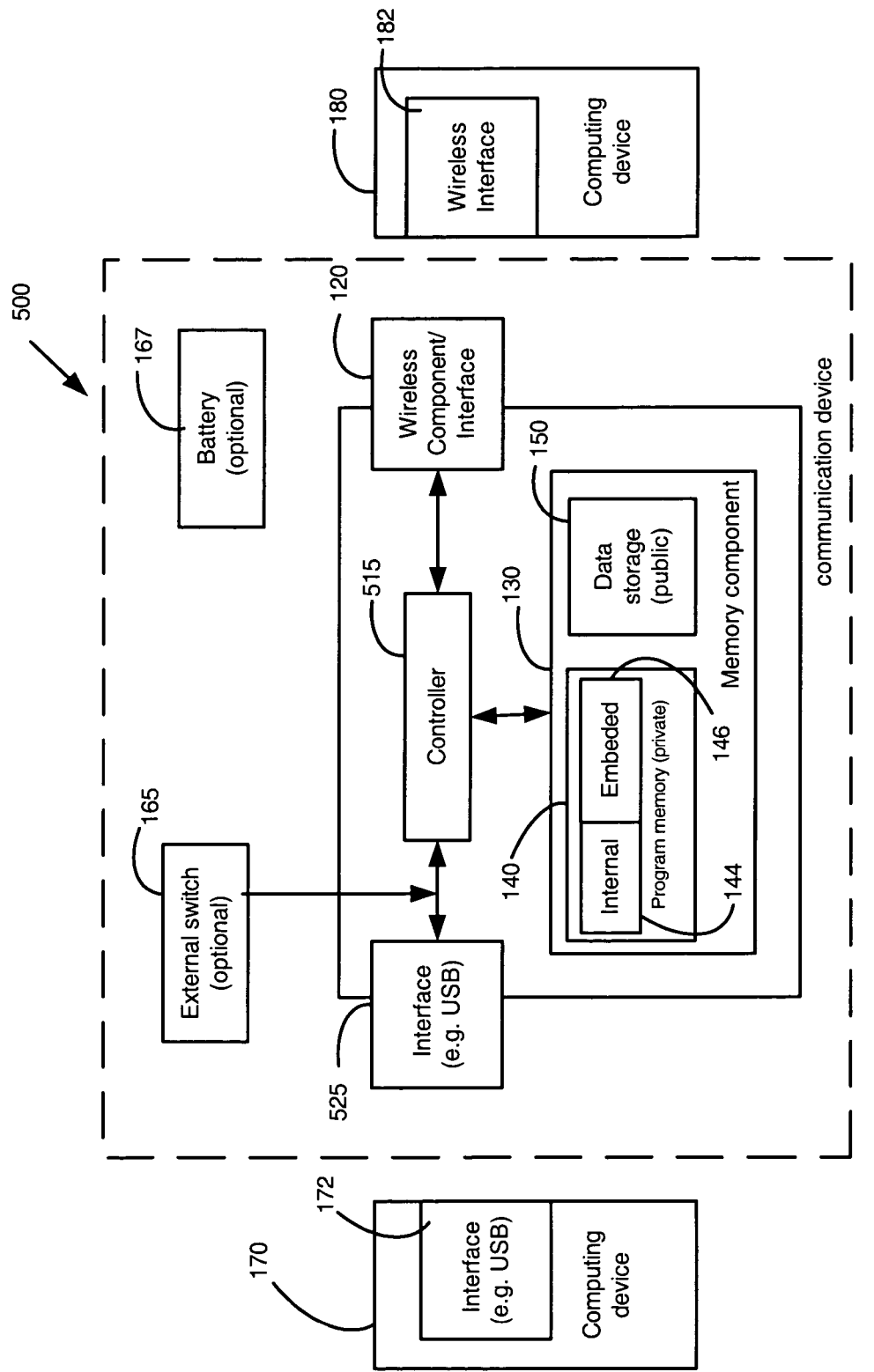

FIGS. 4 and 5 illustrate as additional implementations respective communication devices 400 and 500 of the present invention. Elements of the communication devices 400 and 500 that are common to or the same as elements of communication device 100 are indicated by the same reference numerals.

In communication devices 400 and 500 private memory component 140 is segmented into two sections: internal section 144 and embedded section 146. Internal memory section 144 can store data and programs required for proper functioning of the communication device 100. These programs and data can be accessed by a memory controller 415 and support its functionalities. Embedded memory section 146 can store programs, applications, and data that will be installed or launched on computing device 170 when communication device 100 is plugged into computing device 170. The software program or applications typically may not be viewed or edited (e.g., added, deleted or changed) by user and is embedded during the manufacture of devices 400 and 500.

Memory controller 415 manages communication with the structural external interface 110 (e.g., USB, FireWire, etc.) and memory component 130. Memory controller 415 can be implemented with a microprocessor, DSP, ASIC, etc and may include internal memory for running its program. Additional memory such as those provided by internal memory section 144 can also be implemented if needed. Examples of the functionality and software components that may be implemented with the memory controller 415 include "auto run" or "auto play" functionalities, segmentation of memory 130, data security, and USB interfacing functionalities, among others.

Communication device 400 includes a hub component 425 (e.g., a chip), which combines the components of wireless interface block 120 with the memory component block 130 and its memory controller 415. The hub 425 enables sharing of the same external structural interface 110 (e.g., USB, FireWire) between wireless component 120, memory controller 415 and memory component 130.

FIGS. 1-5 each illustrates an optional battery 167 being included in the respective communication devices 100-500. Optional battery 167 enables each of communication devices 100-500 to receive or send data wirelessly without being plugged into a computing device 170. Typically, each communication device 100-500 draws its operating power computing device 170 when plugged into its interface 172 (e.g., USB).

Communication devices 100-500 of the present invention provide users of mobile devices 180 (e.g., wireless enabled digital camera, mobile phone, etc.) data storage that is integral with the wireless communication and may be independent of computing device 170. In accordance with the present invention, each of communication devices 100-500 can be configured to communicate in a point-to-point manner with a wireless-enabled mobile device 180 (e.g., a Bluetooth digital camera, phone etc). An embedded application (not shown) stored on each wireless device 100-500 can manage the communication with an embedded application in the mobile device 180.

Figure 6:
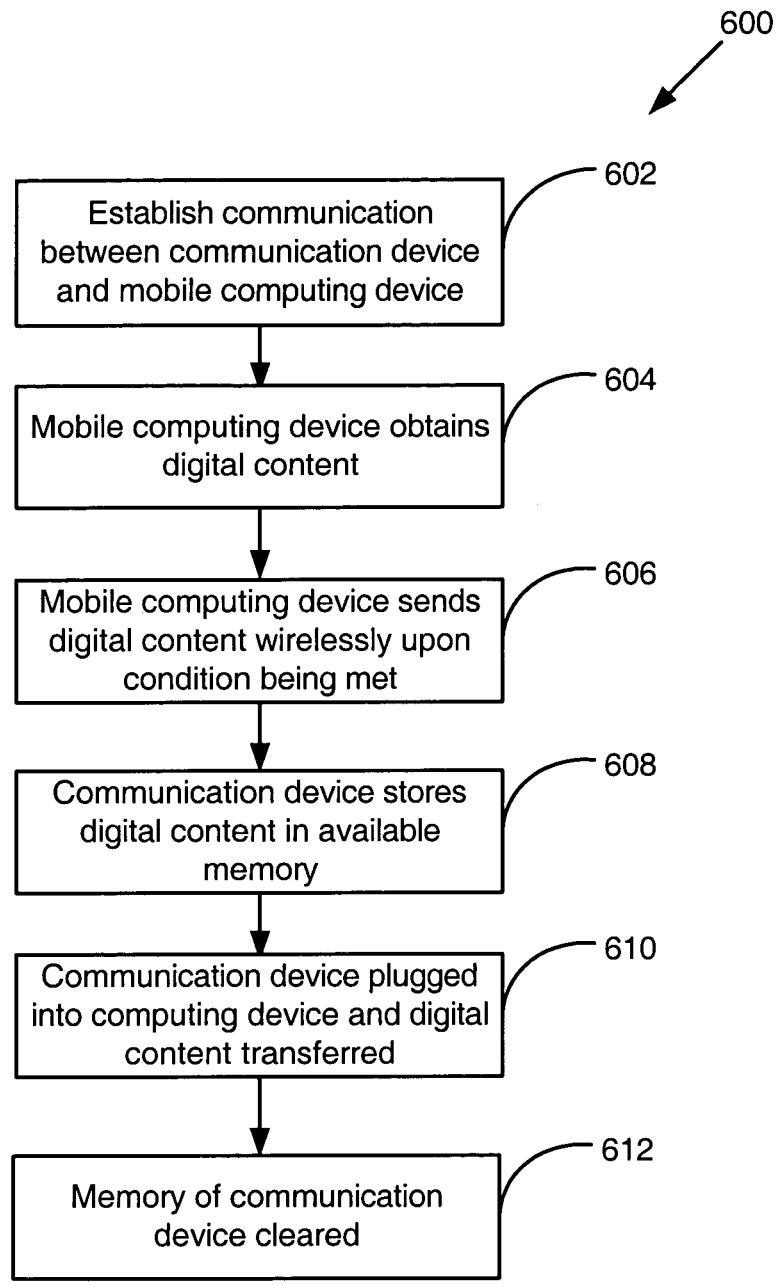
FIG. 6 is a flow diagram of a wireless external data storage process providing data storage that is integral with wireless communication.

FIG. 6 is a flow diagram of a wireless external data storage process 600 providing data storage that is integral with wireless communication. The following descriptions refer to "communication device 100-500" as a singular device to emphasize that the referenced communication device could be any implementation of a communication device of the present invention.

In step 602, a wireless communication channel is established between mobile device 180 and communication device 100-500. This step may include additional steps of negotiating the service options between an application in the mobile device 180 and wireless device 100-500 through an interface. The interface may be part of an application GUI (Graphical User Interface) in the mobile device 180 or as part of a switch or display settings provided by the wireless device 100-500.

In step 604, mobile device 180 obtains or accesses digital content. For example, a photo may be taken with a digital camera or camera phone 180 and the photo stored into a memory component of the mobile device 180 (e.g., flash memory).

In step 606, the mobile device 180 sends the digital content wirelessly to communication device 100-500 automatically upon a predefined condition being met. For example, the predefined condition can be that the data storage contained in the mobile device 180 exceeds a certain preset threshold. The preset threshold can be the maximum storage capacity of the mobile device 180, any other storage level, or any other condition.

In step 608, wireless communication device 100-500 stores the transmitted data into the available memory component 150 of device 100-500 for storage. Optionally, communication device 100-500 may return 100-500 a signal or other type of indication to the user of the mobile device 180 if the capacity of memory capacity in communication device 100-500 is reached.

In step 610, communication device 100-500 is plugged into a computing device 170, the data stored in the wireless device 100-500 is transferred to, synchronized with, or stored in the computing device 170 (e.g., on a hard drive). For example, this step may be performed by an embedded application that automatically launches and runs on the computing device 170. This step may be automatic, or partially automatic or manually aided by the user through a GUI that runs in the computing device 170.

In step 612, the data storage area 150 can be cleared manually by the user, automatically or a combination after the digital content has been transferred to computing device 170, thereby enabling communication device 100-500 to wirelessly receive additional data from the mobile device 180.

Figure 7:
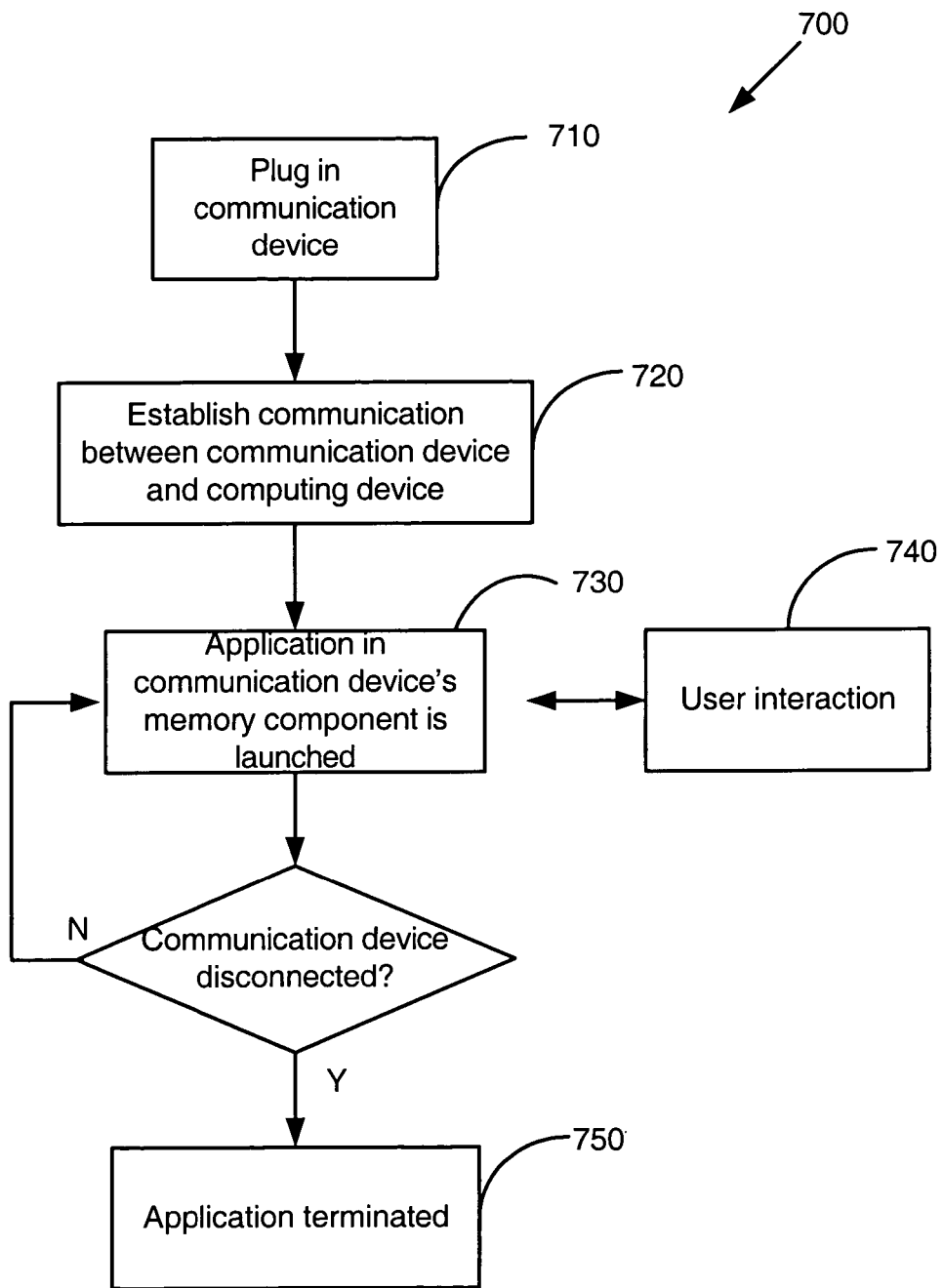
FIG. 7 is a flow diagram that illustrates an exemplary process of using a communication device of the present invention.

FIG. 7 is a flow diagram that illustrates an exemplary method or process of using a communication device 100-500 of present invention.

In step 710, the communication device 100-500 is connected to computing device 170. For example, the connection may use a USB interface or FireWire interface.

In step 720, communication is established between the device 100-500 and computing device 170. For example, the device 100-500 engages dialog with the computing device 170 using one or more standard protocols that are built-into the operating system of the computing device 170 (e.g., a "Plug and Play" feature for USB, and others). In this implementation, the device 100-500 is immediately recognized by the computing device 170 once the connection is made (i.e., no driver or software installation is required). Alternatively, software such as a driver for setting-up communication between the device 100-500 and the computing device 170 may be provided to a user separately (e.g., on a CD or downloaded from a network) if the operating system of the computing device 170 does not include an immediate plug and play feature. In this case, a user installs the software in the computing device 170 so that the device 100-500 can be recognized.

In step 730, one or more applications stored in the memory component 130 may be automatically installed and launched in the computing device 170 when the device 100-500 is connected to the computing device. The installation and launching of the application that is embedded or stored in the communication device 100-500 may be implemented using the "Auto Run" or "auto play" feature, which may be provided by the operating system or software installed in the computing device 170 to automatically launch the program that is stored in the memory component 130 of the communication device 100-500. In one implementation, a pointer may be embedded in the dialog between the device 100-500 and computing device 170 in step 720. The pointer would point to a setup file in the memory component 130 that instructs the computing device 170 to install or run one or more applications stored in the memory component 130. Operating systems can also provide certain means to add entries to AutoRun executables. The various different applications that are stored in the communication device 100-500 may perform various tasks in the computing device 170. For example, they may help manage wireless communication between the computing devices 170 and 180 through wireless interface 120, perform presentations (e.g. Powerpoint™), or perform any of numerous other tasks or operations, some of which are described later with reference to FIGS. 10-16.

In step 740, which is an optional step, a user interacts with the launching of an application from the memory component 130 or the subsequent execution of the application on the device 170. As one example, optional user consent or acceptance may be obtained before the application is installed and run in the computing device 170. As another example, a user may control the execution process of the application, such as giving command to initiate, pause, cancel, or abort the application. User interaction options can be implemented by a GUI (graphical user interface) provided (1) locally in the computing device 170, or (2) remotely from another computing device 180 through wireless communication associated with controlling/interacting with the application stored in the communication device 100-500. In addition, a user may optionally activate/deactivate the communication device 100-500 or one or more of its functions by using the external switch 165 if those options are implemented.

In step 750, if the communication device 100-500 is disconnected from the computing device 170, a disconnection signal is received or intercepted by one or more applications launched in step 230. In one implementation, these applications can automatically uninstall the application or applications from computing device 170, and including itself or themselves and may delete any data stored thereon. In this case, no data from the computing device 180 will be retained in the computing device 170 after the communication device is unplugged, thus enhancing privacy and security.

Uninstalling all applications and deleting all data residing in computing device 170 when device 100-500 is disconnected from computing device 170 has the advantage of ensuring privacy for a user of computing device 170 and also protects the manufacturer of the device 100-500 against piracy of the software applications launched in step 730. The communication device 100-500 in this case functions as a security key. When device 100-500 is no longer plugged into the computing device 170, all software applications previously launched can be uninstalled and all data may be deleted—restoring the computing device to its initial state prior to the device 100-500 being plugged in.

Step 750 can also be implemented in various ways, depending on the type of application. When device 100-500 is disconnected from computing device 170, the one or more applications launched in step 830 can also be configured to uninstall applications and delete data only in part so that only certain application modules and data are removed. One advantage of this implementation is that when communication device 100-500 is again plugged into computing device 170, some installation and setup processes can be skipped and the application will launch faster. As another alternative implementation, all applications and data can be retained in the computing device 170 when communication device 100-500 is unplugged. This may be preferred in certain cases such as if privacy and security is not an issue.

FIG. 8 is a flow diagram of another exemplary method or process of using the communication device 100-500 of present invention.

In addition to the basic operations described with reference to FIG. 7, the communication device 100-500 of present invention may include additional components, means and features for using it as (1) external disk drive for storing, transferring, and retrieving user documents between computing devices, and (2) for adding wireless communication capability to computing device 170 for communicating wirelessly with other computing devices such as computing device 180. The combination of the above features in a single communication device 100-500 enhances the versatility of the communication device of present invention.

In step 810, wireless device 100-500 is plugged into a first computing device 170.

In step 820, wireless device 100-500 is detected by the first computing device 170 (e.g. Play and Play).

In step 830, a user may perform read or write operations with the file storage component 150 of the device 100-500 to use it as an external drive. For example, user may save digital documents to the file storage component 150 or retrieve digital documents stored in the storage component. Step 830 (designated process A) illustrates the communication device 100-500 being used as an external memory drive after communication has been established between the device 100-500 and the computing device 170 such as through a USB interface. No installation of software or driver is needed for using this feature of the device 100-500.

In step 840, the wireless communication means of communication device 100-500 is enabled and activated. Software stored in the device 100-500 may be automatically installed or launched. For example the appropriate wireless communication protocol stack may be installed or launched in the computing device 170, if the computing device 170 does not already have one pre-installed. Such protocol stacks may be automatically launched and installed in the computing device 170 as one of the applications stored in the program memory component 140. User may or may not need to interact with this installation process. In this example, the communication device 100-500 automatically adds wireless capability to the computing device 170 by just plugging in the device 100-500.

In step 850, the computing device 170 may now interact with other wireless enabled devices through the wireless interface 120 of device 100-500. The wireless communication may be enabled with an additional service discovery and selection step. Steps 840 and 850 (designated process B) show the communication device 100-500 having the means for being used as a wireless communication adaptor (e.g., a Bluetooth dongle).

In step 860, an application stored in communication device 100-500 is automatically installed in computing device 170 and launched. In step 870, a query is made as to whether the communication device 100-500 is disconnected from computing device 170. If no, step 870 returns to step 860. If yes, step 870 proceeds to step 880. In step 880, the application is terminated automatically. Steps 860-880 (designated process C) correspond to an autorun functionality described above with reference to FIG. 7.

The communication device 100-500 of the present invention may include any or all of process A (step 830), process B (steps 840-850), or process C (steps 860-880) concurrently or in any combination (e.g. A, B, C, A&B, A&C, B&C, or ABC) for one or more implementations of the device 100-500. For example, an application that is stored in the program memory component 130 of the communication device 100-500 may be launched and executed in the computing device 170 to perform certain tasks (e.g. send and/or receive message from other computing devices, or printing digital document to a printer connected to device 170). The application may require that the communication device 100-500 stay connected for interaction with other computing devices through the wireless interface 120 (e.g. to receive user command from computing device 180). In this example, both process B and process C are required and used.

Conventionally, whenever a first computing device sends, transfers, or retrieves a file or data wirelessly to or from a second computing device, a user must manually issue an accept or reject command for security and privacy reasons. The present invention improves upon such a conventional process without sacrificing security or privacy.

FIG. 9 is a flow diagram of a wireless communication process 900 that maintains security and privacy without requiring users to manually accept or reject actions, thereby making wireless communication easier to use. Process 900 combines processes A, B, and C for transferring files and/or data wirelessly from one device to another.

In step 902, wireless communication device 100-500 is plugged into a first computing device 170 (e.g., step 810).

In step 904, wireless device 100-500 is detected by the first computing device 170 (e.g., step 820), and a wireless application stored in memory component 130 is automatically launched such as through the process of Auto Run (e.g., step 860).

In step 906, the wireless application enables the communication device 100-500 to send and receive wirelessly data to and from another device 180 (e.g., step 840). A discovery process may be included in this step. The user of device 180 can then wirelessly transfer (e.g., send, receive or retrieve) a document from his computing device 180 (e.g., mobile phone, digital camera, PDA, laptop, etc.) to the communication device 100-500.

In step 908, computing device 180 can send or retrieve data to or from public storage component 150 of the wireless device 100-500 without the need for the user of the first computing device 170 to respond or grant permission (e.g., step 850, process B). The public storage component 150 of the wireless device 100-500 may be configured to be public, and wireless device 100-500 is connected externally to the computing device. This is in contrast to the hard drive of the first computing device 170, which is private to the user of the first computing device 170. Data is transferred to and from mobile device 180 with communication device 100-500 and not directly to and from the hard drive of the computing device 170.

In step 910, the user of the first computing device 170 can receive data sent from the second computing device 180 by retrieving the data or file received from computing device 180 and stored in the public storage area 150 of device 100-500 (e.g., step 830, process A).

Alternately, in step 912, if the user of the first computing device 170 desires to make available or public certain data or files for a second computing device 180, he can simply copy the data or file from his computing device 170 to the public storage area or component 150 of communication device 100-500 (e.g., step 330). The files and data in the public area in the communication device 100-500 become available for other users, and the second computing device 180 can now retrieve the file wirelessly from the public storage area of the memory component 150 in device 100-500 (e.g., step 850, process B).

In step 914, wireless device 100-500 is unplugged and the application that was launched in the computing device 170 may be uninstalled and all data may be totally or partially deleted (process C).

FIGS. 10-16 illustrate additional exemplary implementations of communication devices 100-500 according to the present invention and various applications that may be stored in the memory component 130 can be launched for execution and processing in the computing device 170.

FIG. 10 is a block diagram illustrating a system where the communication device 100-500 is used to enable output of data content from a computing device 1020 to one or more output devices 1040 that are connected to a computing device 1030.

Examples of computing device 1030 include but are not limited to desktop PCs, laptop PCs, tablet computers, servers, PDAs, and handheld computers. The computing device 1030 has at least a USB interface, for example, which can connect to the communication device 100-500 of present invention. Other interfaces are also possible as described above.

Computing device 1020 includes, but is not limited to, desktop PCs, laptop PCs, tablet computers, servers, PDAs, handheld computers, Internet information appliances, mobile phones, web pads, digital cameras, and combinations of these devices. The computing device 1020 has at least a wireless interface that can communicate with the communication device 100-500 through wireless communication protocols such as Bluetooth, Infrared, IEEE 801.11a, IEEE 801.11b (WiFi), IEEE 801.11g, Zigbee, among others. It should be noted that although only one computing device 1020 is shown here, the computing device 1030 with the connected device 100-500 may service more than one computing device 1020 concurrently or alternatively or in combination. In this case, the application 1010 may provide features such as queuing and spooling.

Application 1010 correspond to one or more software components or applications stored or embedded in the memory component 130 of the communication device 100-500. As discussed earlier, application 1010 may be launched and executed automatically in the computing device 1030 when device 100-500 is connected to computing device 1030. For example, application 1010 may AutoRun when device 100-500 is connected to device 1030, with no driver or application installation by the user being necessary. In this particular example, the application 1010, after launching in the computing device 1030, may perform one or more of the following operations:

Establish a communication channel with computing device 1020 and application 1022. This operation may further include a discovery process as well as sending of information relating to the service that computing device 1030 can provide to computing device 1020.

Receive or retrieve digital data content from mobile computing device 1020. Data content includes still images, documents (Word processing documents, presentation documents, images, text, spreadsheets, Web pages etc), video images, and or sound data. Data content may be received from computing devices 1020 through wireless communication. Alternatively, the data content can be retrieved from the file storage component 150 of the communication device 100-500. In this case, the data content may have been already stored by the user into the memory component 130 before communication device 100-500 is connected to computing device 1030, or the data content may be have been previously received from a computing device (e.g., computing device 1020) and cached in the memory component 130 temporarily or permanently due to a previous similar operation on the same document.

Process the digital data received in computing device 1030. This may include one or more components and operations for:
1. Decrypting/decompressing the received data content (e.g., digital document).
2. Parsing or interpreting the data content.
3. Converting the data content to a format suitable for input to one or more output devices 1040 connected to the computing device 1030. Converting of the data may be performed by the same software application, or a separate application may be launched to perform such data conversion4. Monitoring and providing information on the output process (e.g., status, payment information, time left to complete, error messages, etc.) through a graphical user interface (GUI) on the computing device 1020 or 1030;
5. Receiving and implementing user instructions to the output process (e.g., initiate, pause, or cancel);
6. Invoking other applications (e.g. a driver application) residing in the computing device 1030 to participate in one or more of the above processes or operations. As an example, a printer driver or raster image processor application may be launched to process or convert the data content suitable for input to a selected output device 1040 associated with or connected to computing device 1030.
7. Queuing and spooling digital documents if more than one digital document are received from one or more computing devices 1020. The temporary queuing of the data can be in the memory or storage component 130 or in the memory or storage in the computing device 1030.

Output the data content received or to be received to one or more selected output devices 1040 associated with or connected to computing device 1030.

After detecting the disconnection of the communication device 100-500, the one or more programs 1010 may completely or partly uninstall and/or delete themselves as well as any other applications launched from the communication device 100-500 to the computing device 1030. Any temporary data that was not previously in the computing device 1030 may also be deleted.

In addition to the application 1010 above, the memory or storage component 130 of the communication device 100-500 may include other programs (not shown) that can be launched and executed in the computing device 1030. An example of such a program is a portion or the entire wireless communication protocol stack that allows the computing device 1030 to communicate with other computing devices wirelessly through the wireless interface 120 of communication device 100-500. Another example of application 1010 includes components that execute and/or control a presentation program (e.g. PowerPoint®) with the presentation file received and being controlled wirelessly from computing device 1020.

Application 1022 is a software application residing in the computing device 1020. The application 1022 may include any or all of the following components and functionalities:
1. Discover the existence of one or more computing devices (e.g. computing system 1035) through wired or wireless communication links. This step may further include automatically or manually selecting one or more computing devices 1030 for providing service from a list of discovered computing devices 1030.
2. Establish communication with computing system 1035 and with application 1010.
3. Receive information from computing system 1035 such as through application 1010. The received information may include one or more of the following: (1) the number and type of output devices (e.g. printers, display devices and projectors) connected to or associated with computing system 1035 that is available for service to computing device 1020. (2) The type and quality of service, (3) availability of service, (4) price and billing information among others.
4. Transmit data content to computing system 1035.
5. Encrypt and/or compress the data content prior to data transmission.
6. Receive information from computing system 1035 related to the status of the output process (e.g., output status, payment requirement, time left to complete, error messages, quality of service selected etc.) from the application 1010.
7. Provide a GUI in the computing device 1020, that enables user of computing device 1020 to (1) select a computing system 1035 among a list of available computing systems discovered for service, (2) select one or more output devices 1040 associated with selected computing system 1035 for providing the output service. (3) Display information on the output process (e.g. status, time left to complete, error messages, etc.) and/or give instruction to adjust the output process (e.g. provide payment, initiate, pause, cancel, change of service etc ).
8. Transmit user command to the application 1010, whereby allowing the user to remotely control the output process of computing system 1035 from the computing device 1020.

Blocks 1040 represent output devices. Printers, projectors and monitors are shown as examples of output devices. However, output devices may also include TVs, fax machines, multifunctional machines (e.g. printer/fax/scanner), copiers, sound output systems, among others.

FIG. 11 shows a flow diagram for an exemplary data output process 1150 (e.g. output or printing of digital document) using the system configuration as shown in FIG. 10.

In step 1160, a user has a document in his mobile computing device 1020 that he wishes to print. He connects his communication device 100-500 to the computing device 1030 such as through a USB interface. As discussed earlier, communication is then established between the communication device 100-500 and the computing device 1030.

In step 1165, application 1010 stored in the device 100-500 is launched in the computing device 1030. Optionally, if the wireless communication stack is not already included in application 1010, another program (e.g., which includes wireless communication protocol stack) can also be launched to allow the computing device 1030 to communicate with other devices wirelessly.

In step 1170, application 1022 residing in the computing device 1020 interacts with application 1010 launched in the computing device 1030 to manage or negotiate the data transmission process. User of computing device 1020 may select from a GUI in his mobile device 1020 one or more output devices 1040 associated with or connected to the selected computing system 1035 for providing the output or rendering service. Application 1022 may transmit data content 1024 from the device 1020 to device 1030 through wireless communication link 1015. Application 1022 may encrypt and or compress data content 1024 before transmission.

In step 1175, the data content 1024 received by the device 1030 is further processed. Such process may include, but not limited to, reading, parsing, interpreting, decrypting, and decompressing the data content 1024 received. Process 1175 may also include converting the data content to output data format (e.g. print data, image file) suitable for input to the selected output devices 1040 for output or rendering. These operations may be performed by the application 1010 in the computing device 1030. Or alternatively, application 1010 may invoke other applications (e.g. printer driver application) residing in the computing device 1030 to help in one or more steps in the further processing of the digital document 1024.

In step 1180, the further processed data content 1024 and generated output data is then sent to the output device 1040 for printing or rendering.

During the output process, user may obtain information related to the output process status through a GUI in the computing device 1020. The user may also provide instructions to adjust the output process or options through the GUI.

After the output process has been completed, the user may disconnect 100-500 from the computing device 1030. The application 1010 automatically exits and may remove or uninstall itself from the computing device 1030. Any data that was used in connection with the output process may also be removed or deleted. No data of the content 1024 is left in the computing device 1030, which enhances privacy and security.

FIG. 12 illustrates a flow diagram for another exemplary data output process 1250(e.g. display or presentation of digital content) using the system configuration as shown in FIG. 10.

Steps 1260, 1265, and 1270 are identical to respective steps 1160, 1165, and 1170 shown in FIG. 11.

In step 1275, the data content 1024 (e.g., a presentation file such as in a PowerPoint® format) is displayed or projected by output device 1040 (e.g., a projector).

In step 1280, the display of data content 1024 is controlled by device 1020. Such control may include, but is not limited to, starting or ending the display, going forward to the next page or backward to the previous page, enlarge or minimize the displayed image. Other exemplary features include reading notes of the presentation file with mobile device 1020, while the data content (without the notes) is projected to a projector 1040 through computing device 1030. A GUI may be provided in device 1020 for the user to perform the above-mentioned control.

After the presentation process has been completed, the user may disconnect device 100-500 from the computing device 1030. The application 1010 automatically exits and removes itself from the computing device 1030 as well as any data or file that was used in connection with the data output process. No data of the content 1024 is left in the computing device 1030.

FIG. 13 is a block diagram illustrating another system where the communication device 100-500 is used to enable output of digital document from computing device 1330 to output devices 1340 that are connected to computing device 1320. Computing device 1320 includes wireless communication capability. This may be enabled by built-in wireless hardware or by plugging in a communication device 100-500 or by other wireless enabled external devices.

Application 1310 is stored or embedded in the memory component 130 of the communication device 100-500. As discussed earlier, application 1310 may be launched and executed in the computing device 1330 once the device 100-500 is connected to or plugged into computing device 1330. In this particular example, the application 1310, after launched in the computing device 1330, may include but not limited to any combination of the features below:

1. Install necessary drivers, application, and or wireless communication stack in the computing device 1330;
2. Discover the existence of other computing devices including 1320;
3. Receive information relating to one or more discovered devices (e.g. name, id, availability, type of service, service or communication options, quality of service, price etc. )
4. Transmit data content to the computing device 1320;
5. Encrypt and/or compress the digital document prior to the transmission;
6. Receive information on the output process (e.g. status, payment requirement, time left to complete, error messages, etc.) from the application 1325.
7. Provide a GUI in the computing device 1330. The GUI allows the user to select one or more computing devices for communication from a list of discovered computing devices available 1320. Further, the user may select one or more output devices 1340 from a list of available output devices that is connected to the selected computing device 1320. The GUI may further include means for user to obtain information on the output process and/or give instruction to the output process. For example this may include providing payment information, status information as well as GUI for controlling the functionality of application 1325 such as initiating, pausing, or canceling the process.
8. Transmit user command to the application 1325, whereby allowing the user to remotely control the output process from the computing device 1330.
9. After detecting the disconnection of the device 100-500, perform a complete un-installation of all the applications installed or deletion of temporary files from the computing device 1330 and exit, leaving the computing device the same state as before the communication device 100-500 was connected. In another implementation, perform only a partial un-installation of the applications and or deletion of files. This may help speed up the setup time when device 100-500 is plugged in again the second time.

In addition to application 1310, the program memory 140 may include other programs that can be launched and executed in the computing device 1330. An example of such program is wireless communication protocol stack that allows the computing device 1330 to communicate with other computing devices wirelessly through the communication adapter's wireless interface 120.

Computing device 1330 includes, but not limited to desktop PCs, laptop PCs, tablet computers, servers, PDAs, handheld computers, Internet appliances, Web pads, mobile phones, and digital cameras among others. Preferably, computing device 1330 is a mobile device. The computing device 1330 has at least a USB interface, Firewire, SD (secure digital) interface or CF (compact flash) interface among others that can connect with the interface 110 (e.g., USB) of device 100-500. It should be noted that although only one computing device 1330 is shown here, the computing device 1320 (with the application 1325) may service more than one computing devices 1330 (connected to the communication device 100-500) either concurrently or in an alternative manner for providing service. For example, application 1325 may provide queuing and spooling services based on one or more of quality of service, price, and availability means.

Examples of computing device 1320 include but not limited to desktop PCs, laptop PCs, tablet computers, servers, PDAs, handheld computers, and other dedicated computing devices. Computing device 1320 has at least a wireless interface which can communicate with the device 100-500 through one or more wireless communication protocols such as Bluetooth, Inferred, IEEE 802.11a, IEEE 802.11b, IEEE 802.11g, IEEE 802.11f, IEEE 802.15, IEEE 802.17, etc. As described earlier, the wireless interface of the computing device 1320 may be implemented by built-in wireless communication hardware or by external wireless adapters or by communication device 100-500.

Application 1325 resides in the computing device 1320. In this particular example, the application 1325 in the computing device 1320 may have the following components and functionalities:

1. Send and/or broadcast information to one or more computing devices such as announcing the availability for communication or service, type, options, price and or quality of service.
2. Receive data content from other computing devices (e.g., device 1330), or retrieve data content from the storage component of the computing device 1320.
3. Process the data content received, including one or more of:

Decrypting/decompressing the data content received.

Parsing or interpreting the data content.

Converting the data content to a format suitable for input to one or more output devices connected to the computing device 1320.

Monitoring and providing information on the output process (e.g. status, payment information, time left to complete, error messages, etc.) through a GUI in the computing device 1320 or 1330.

Receiving and implementing user instructions to the output process (e.g. initiate, pause, or cancel).

Invoking other applications (e.g. driver application) residing in the computing device 1320 to participate in one or more of the above process.

Queuing and spooling data content if more than one output job is received from one or more computing devices 1330.

Sending one or more output devices 1340 (e.g. printer, projector, monitor, etc.) data content for output.

FIG. 14 is a flow diagram showing an exemplary process 1450 of the present invention for wireless output of data content (e.g., digital document printing) using the system shown in FIG. 13. As an example of an application for this invention, a clerk of a photocopy print shop (e.g. Kinko's® or a business service lounge) may hand a communication device 100-500 to a customer who enters the shop. The customer has stored in his computing device 1330 a document that he needs to print. The customer just plugs the wireless communication device 100-500 into his computing device 1330 and easily prints out the document to one or more printers connected to the computing device 1325 that is available in the print shop.

In step 1460, a user connects communication device 100-500 to computing device 1430 through USB interface or another interface. As discussed earlier, communication and interaction is then established between the device 100-500 and the computing device 1330.

In step 1465, application 1310 stored in communication device 100-500 is launched in the computing device 1330. This may be launched automatically such as through an AutoRun process as previously discussed. Optionally, another program or component included in application 1310 (e.g., a wireless communication protocol stack) may also be launched in the computing device 1330 from the memory component of the device 100-500 to allow the computing device 1330 to communicate with other devices wirelessly. In step 1465, application 1310 may further include a discovery and selection of the computing device 1325 from among a list of available computing devices available for communication. Information relating to the output device 1340 associated with computing device 1325 may be received and displayed to the user at the computing device 1330 so the user can select the output device 1340.

In step 1470, user transmits data content 1335 (e.g., a digital document) from computing device 1330 to computing 1320 through wireless communication link 1315. Application 1325 residing in the device 1320 communicates with application 1310 running in the computing device 1330 to manage the transmission process. Application 1310 may provide a GUI in device 1330 where the user can obtain information on the output process or interact and control the output process. The application 1310 may encrypt and or compress data content 1335 before transmission.

In step 1475, the data content 1335 (e.g., digital document) received by the device 1320 is further processed. Such processing may include, but is not limited to, reading, parsing, interpreting, decrypting, and decompressing, raster image processing the digital document 1335 received. One or more of these processes may include invoking one or more other applications (e.g. presentation application, printer driver, viewer software etc residing in computing device 1320). Process 1475 may also include converting the digital document to an output data format (e.g. print data, image file) suitable for input to one or more output devices 1340 associated with computing device 1320. These operations may be performed by the application 1325. Alternatively, application 1325 may invoke other applications (e.g. presentation application, printer driver application, viewer or browser application etc) residing in the computing device 1320 to help in one or more of the above described processes as well as steps for further processing of the data content 1335 (e.g., digital document).

In step 1480, the processed data content 1335 or output data is sent to output device 1340 (e.g. printer) for rendering (e.g. printing, displaying or projecting).

After the output process has been completed, the user may disconnect the device 100-500 from device 1330. Disconnecting device 100-500 triggers the application 1310 to automatically exit and remove itself as well as the traces of data relating to the data content 1335.

FIG. 15 is a flow diagram showing another exemplary process 1500 of the present invention for wireless display of data content (e.g. presentation of data to a projector) using the system 1300 shown in FIG. 13.

Steps 1560, 1565, and 1570 are identical to respective steps 1460, 1465, and 1470 shown in FIG. 14. In step 1575, the data content 1335 in the mobile device 1330 is displayed by a projection device 1340, connected to or associated with computing device 1320.

In step 1580, the display of data content 1335 (e.g., a Power Point® presentation file from Microsoft) is controlled by mobile device 1330. Such control may include, but not limited to, starting or ending the display, going forward to the next page or backward to the previous page, enlarge or minimize the displayed image. A GUI may be provided in mobile device 1330 for user to perform the above-mentioned control. Notes related to the presentation pages may be displayed in the GUI of 1330 as an optional feature while the notes do not need to be displayed on by the projector 1340 during the presentation of the presentation file.

After the wireless presentation process has been completed, the user may disconnect device 100-500 from device 1330. Disconnecting device 100-500 triggers the application 1310 to automatically exit and remove itself as well as the trace of data relating to the data content that may reside in communication device 100-500.

FIG. 16 is a block diagram illustrating another system where the communication device 100-500 is used to enable wireless device-to-device communication (e.g. messaging).

Computing device 1610 may include, but is not limited to, desktop PCs, laptop PCs, tablet computers, servers, PDAs, handheld computers, Internet appliances, mobile phones, and digital cameras.

Application 1630 is stored in the memory component 130 of the communication device 100-500. Once the communication device 100-500 is connected with the computing device 1610, the application 1630 is launched and executed in the computing device 1610. The application 1630 can be launched automatically with AutoRun previously discussed. FIG. 16 illustrates two separate communication devices 100-500 plugged into two distinct computing devices 1610, enabling the two computing devices 1610 to communicate wirelessly such as messaging and or transferring data among the two computing device 1610.

In this particular example, the application 1630 is a messaging application. The application 1630 may include one or more of the following components and functionalities including but not limited to:

1. Adds wireless capability to computing device 1610. Application 1630 may include a wireless stack, which enables computing device 1610 to communicate wirelessly with another device through the use of communication device 100-500.
2. Discover one or more computing devices available for wireless communication.
3. Providing a GUI where user may enter authentication information (e.g. password, PIN #, biometric information) to be connected/logged into a specific group through wireless communication.
4. Receive and interpret authentication information provided by other computing devices before establishing communication channel with that device.
5. Implement GUI in the computing device 1610 where user can compose and send messages to be transmitted to other computing devices.
6. Implement GUI in the computing device 1610 where user can receive and view messages transmitted to the other computing devices.
7. Encrypt/decrypt, and or compress/decompress messages before sending and receiving. Different encryptions may be implemented for different user groups to ensure privacy.
8. Send and receive files or documents to the public memory component 150 of communication device 100-500 (e.g. flash memory) among the computing devices 1610 that has communication device 100-500 plugs in.

In addition to application 1630, the program memory 140 may include other programs that can be launched and executed in the computing device 1610. An example of such program is wireless communication protocol stack that allows the computing device 1610 to communicate with other computing device wirelessly through the wireless communication interface 120 of device 100-500.

Other examples of Application 1630 that can be launched when device 100-500 is plug in to computing device 1610, include communicate and sharing of service privately through local point to point wireless communication link 1640. Examples of local wireless point-to-point communication include instant messaging, e-mail, phone calls. Other services that can be shared among the users of computing device 1610 include Internet access, transfer and sharing of files, document editing collaboration, printer and other output devices etc.

The invention claimed is:

1. A portable wireless communication USB device that is implemented to be connectable to and disconnectable from an external USB port of a computing device by a user of the portable wireless communication USB device to provide the computing device with wireless Internet access through the portable wireless communication USB device, the portable wireless communication USB device not being an integrated part of the computing device, comprising:

a structural USB device interface that is user-connectable to and user-disconnectable from a structural non-wireless external USB port of the computing device;

a wireless communication component for enabling wireless radio frequency communication and for wireless Internet access;

a memory circuit including a private memory area storing a protected software component that is executable at the computing device to enable the computing device to wirelessly access the Internet and to conduct wireless radio frequency communication using the wireless communication component of the portable wireless communication USB device, the protected software component stored in the private memory area of the portable wireless communication USB device is not accessible by the user of the computing device at the private memory area of the memory circuit of the portable wireless communication USB device; and a memory controller for managing communication with the structural USB device interface, the memory controller providing automatic operation upon connecting the portable wireless communication USB device to the computing device by accessing and obtaining at least part of the protected software component from the private memory area of the memory circuit, and the memory controller facilitating automatic execution of the at least part of the protected software component accessed, by the memory controller, from the private memory area of the memory circuit to be automatically executed on the computing device upon connecting the portable wireless communication USB device to the computing device; and wherein the at least part of the protected software component stored at the private memory area of the memory circuit, which is not accessible by the user of the computing device at the private memory area of the memory circuit of the portable wireless communication USB device, is accessible by the memory controller; and wherein automatic execution, at the computing device, of the at least part of the protected software component is enabled, at least in part, by the memory controller; and wherein the portable wireless communication USB device facilitates automatic execution of the at least part of the protected software component at the computing device automatically upon connecting the portable wireless communication USB device to the computing device, and the at least part of the protected software component enables, at least in part, the computing device with wireless Internet access through the wireless communication component of the portable wireless communication USB device; and wherein the protected software component, stored in the private memory area and automatically executed at the computing device, includes software or data for enabling wireless communication of the computing device using the wireless communication component of the portable wireless communication USB device.

2. The portable wireless communication USB device of claim 1 in which the memory circuit further includes a file storage memory segment to store data content, the data content stored in the file storage memory segment being accessible and viewable by the user at the computing device when the portable wireless communication USB device is plug connected to the structural non-wireless external USB port of the computing device.

3. The portable wireless communication USB device of claim 1 in which the private memory area includes a first memory section to store the at least part of the protected software component and a second memory section to store code for operating the memory controller included in the portable wireless communication USB device.

4. The portable wireless communication USB device of claim 1 in which the at least part of the protected software component is operable to be automatically uninstalled, at least partly, from the computing device, or to be automatically removed, at least partly, from the computing device, upon disconnection of the structural USB device interface of the portable wireless communication USB device from the structural non-wireless external USB pot of the computing device.

5. The portable wireless communication USB device of claim 1 further comprising a user-operable external switch to provide user control of activation and deactivation of the wireless communication component.

6. The portable wireless communication USB device of claim 1 further comprising a battery for powering the portable wireless communication USB device without connection to the computing device so that the portable wireless communication USB device is operable to receive data content via wireless communication without connection to the computing device.

7. The portable wireless communication USB device of claim 1 wherein the computing device further comprises at least one of a desktop PC, a laptop PC, a tablet computer, a server, a handheld computer, an Internet information appliance, a digital camera, a mobile phone, or a web pad, individually or in any combination.

8. The portable wireless communication USB device of claim 1 wherein the at least part of the protected software component enables the computing device to further provide Internet sharing over the computing device to other devices for Internet access.

9. The portable wireless communication USB device of claim 1 in which the portable wireless communication USB device further includes one or more of a Firewire interface, an an Ethernet interface, a Compact Flash interface, a Wi-Fi interface, a ZigBee interface, or a Secure Digital interface, individually or in any combination.

10. The portable wireless communication USB device of claim 1 in which the wireless communication component complies with (1) at least one protocol within a Bluetooth standard of wireless communication, or (2) at least one protocol within one or more IEEE 802 standards of wireless communication, individually or any combination of (1) or (2).

11. The portable wireless communication USB device of claim 1 in which the private memory area is configured as a secure memory area for storing the at least part of the protected software component, and the at least part of the protected software component is embedded during manufacturing of the portable wireless communication USB device.

12. The portable wireless communication USB device of claim 1 in which the at least part of the protected software component further provides data content for output, which includes one or more of printing, displaying, projecting, or audio output of the data content, individually or in any combination, to one or more output devices associated with the computing device.

13. The portable wireless communication USB device of claim 1 wherein the portable wireless communication USB device is configured as a dongle.

14. A portable wireless communication USB device that is implemented to be connectable to, and disconnectable from, an external port of a computing device by a user of the portable wireless communication USB device to provide the computing device with wireless Internet access through the portable wireless communication USB device, the portable wireless communication USB device not being an integrated part of the computing device, comprising:

a structural device interface that is user-connectable to and user-disconnectable from a structural non-wireless external interface of the computing device;

a wireless communication component for enabling wireless radio frequency communication;

a memory circuit at the portable wireless communication USB device having a private memory area storing therein at least part of protected data that is operable to be automatically executed or activated on the computing device subsequent to connecting the structural device interface of the portable wireless communication USB device to the structural non-wireless external interface of the computing device, thereby to provide the computing device with wireless Internet access through the wireless communication component of the portable wireless communication USB device; and a memory controller operable for managing communication with the structural device interface and for accessing the at least part of the protected data from the private memory area of the memory circuit at the portable wireless communication USB device for automatic execution or activation of the at least part of the protected data on the computing device subsequent to connecting the portable wireless communication USB device to the computing device; and wherein the at least part of the protected data, which is stored at the private memory area of the memory circuit, is implemented to be not accessible by a user of the computing device at the private memory area of the memory circuit of the portable wireless communication USB device, but is implemented to be accessible by the memory controller; and wherein automatic execution, at the computing device, of the at least part of the protected data is enabled, at least in part, by the memory controller;

and wherein the protected data enables, at least in part, the computing device with wireless Internet access through the wireless communication component of the portable wireless communication USB device, subsequent to connecting the portable wireless communication USB device to the computing device.

15. The portable wireless communication USB device of claim 14 in which the memory circuit further stores at least part of an autorun software that is operable to install or execute a computer software application on the computing device upon connection of the structural device interface of the portable wireless communication USB device to the structural non-wireless external interface of the computing device.

16. The portable wireless communication USB device of claim 15 in which the at least part of the protected data is further operable to be automatically uninstalled from the computing device, or to be automatically removed from the computing device, upon disconnection of the structural device interface of the portable wireless communication USB device from the structural non-wireless external interface of the computing device.

17. The portable wireless communication USB device of claim 14 in which the private memory area of the memory circuit is configured as a secure memory area for storing the at least part of the protected data.

18. The portable wireless communication USB device of claim 14 further comprising a user-operable external switch to provide control of activation and deactivation of the wireless communication component to the user.

19. The portable wireless communication USB device of claim 14 wherein the at least part of the protected data enables the computing device with wireless Internet access via the wireless communication component of the portable wireless communication USB device.

20. The portable wireless communication USB device of claim 14 in which the memory controller is part of a controller that controls the memory circuit and the wireless communication component.

21. The portable wireless communication USB device of claim 14 wherein the at least part of the protected data further comprises computing software or data and, upon connecting the portable wireless communication USB device to the structural non-wireless external interface of the computing device, the portable wireless communication USB device is configured to automatically execute, at least partly, the computing software or data at the computing device.

22. The portable wireless communication USB device of claim 14 in which the wireless communication component complies with at least one protocol within a Bluetooth standard of wireless communication or a ZigBee standard of wireless communication.

23. The portable wireless communication USB device of claim 14 in which the wireless communication component complies with at least one protocol within one or more IEEE 802 standards of wireless communication or within Wi-Fi communications.

24. The portable wireless communication USB device of claim 14 wherein the portable wireless communication USB device is configured as a dongle.

25. The portable wireless communication USB device of claim 14 further comprising a battery to provide battery-powered operation of the portable wireless communication USB device.

26. The portable wireless communication USB device of claim 14 in which the memory circuit further stores a pointer to an executable for running at the computing device.

27. A portable wireless communication USB device for providing a computing device with wireless Internet access or wireless Internet sharing through the portable wireless communication USB device, the portable wireless communication USB device not being an integrated part of the computing device and being connectable to, and disconnectable from, an external USB port of the computing device by a user of the portable wireless communication USB device, comprising:
  a USB interface for connecting to a structural non-wireless external USB port of the computing device;
  a wireless communication component for enabling wireless radio frequency communication;
  a memory circuit storing wireless Internet access data, the wireless Internet access data being executable on the computing device to provide the computing device with wireless Internet access or wireless Internet sharing upon connecting the portable wireless communication USB device to the computing device; and
  a memory controller for:
    managing communication with the USB interface,
    facilitating, by the memory controller, an operation for automatically providing the computing device with the wireless Internet access data upon connecting the USB interface to the computing device, and
    accessing and obtaining at least part of the wireless Internet access data from the memory circuit upon connecting the USB interface to the computing device to automatically execute or activate at least part of the wireless Internet
  access data from the memory circuit on the computing device; and
  wherein the wireless Internet access data stored in the memory circuit of the portable wireless communication USB device does not include a device specific driver, specific to the portable wireless communication USB device, for installing at the computing device; and
  wherein the at least part of the wireless Internet access data, which is stored at the memory circuit, is implemented to be not accessible by a user at the memory circuit of the portable wireless communication USB device, but is implemented to be accessible by the memory controller; and wherein automatic execution, at the computing device, of the at least part of the wireless Internet access data is enabled, at least in part, by the memory controller; and
  wherein the wireless Internet access data enables, at least in part, the computing device with wireless Internet access through the wireless communication component of the portable wireless communication USB device, upon connecting the USB interface to the computing device.

28. The device of claim 27 in which the memory circuit further includes a file storage memory segment to store data content, the file storage memory segment being accessible by the computing device for storing data.

29. The device of claim 27 in which the memory circuit further includes a private area that includes a first memory section to store the wireless Internet access data and a second memory section to store data for operating the memory controller; and the private area is configured as a secure memory area.

30. The device of claim 27 in which the wireless Internet access data includes at least part of computer software and the at least part of computer software is further operable to uninstall, or to exit, or to remove the at least part of the computer software from the computing device automatically upon disconnection of the USB interface of the portable wireless communication USB device from the structural non-wireless external USB port of the computing device.

31. The device of claim 27 wherein the wireless Internet access data further includes computing software and, upon connecting the portable wireless communication USB device to the structural non-wireless external USB port of the computing device, the portable wireless communication USB device is configured to automatically install and execute at least part of the computing software at the computing device.

32. The device of claim 27 further comprising a battery for powering the wireless communication component without connection to the computing device.

33. The device of claim 27 further comprising a user-operable external switch to provide user control of operation of the portable wireless communication USB device.

34. The device of claim 27 in which the portable wireless communication USB device complies with at least one protocol within a Bluetooth standard of wireless communication or a ZigBee standard of wireless communication.

35. The device of claim 27 in which the portable wireless communication USB device complies with at least one protocol consistent within one or more IEEE 802.11 wireless standards of wireless communication or within Wi-Fi communications.

36. The device of claim 27 in which the portable wireless communication USB device is configured as a dongle.

37. The device of claim 27 in which the wireless communication component further includes a radio component and a baseband controller for enabling the wireless radio frequency communication.

38. The device of claim 27 in which the portable wireless communication USB device further provides a phone calling service.

39. A portable wireless communication USB device method for providing a computing device with wireless Internet access through a portable wireless communication USB device, the portable wireless communication USB device not being an integrated part of the computing device, and the portable wireless communication USB device including:
 a structural USB device interface that is user-connectable to and user-disconnectable from a structural non-wireless external USB port of the computing device,
 a wireless communication component that includes a radio and a baseband controller for enabling wireless radio frequency communication,
 internal memory circuitry for storing instructions and data required for functioning of the wireless communication component, the internal memory circuitry storing at least part of protected data, and
 a memory controller for managing communication through the structural USB device interface and accessing the internal memory circuitry that includes the at least part of protected data, and wherein, upon connecting the portable wireless communication USB device to the structural non-wireless external USB port of the computing device, the portable wireless communication USB device method comprises:
 accessing and obtaining, by the memory controller, at least part of the protected data from the internal memory circuitry subsequent to connecting the portable wireless communication USB device to the structural non-wireless external USB port of the computing device;
 providing, by the memory controller, the at least part of protected data accessed from the internal memory circuitry of the portable wireless communication USB device to the computing device subsequent to connecting the portable wireless communication USB device to the structural non-wireless external USB port of the computing device; and
 enabling the computing device with the wireless Internet access through the wireless communication component of the portable wireless communication USB device with the at least part of protected data provided from the portable wireless communication USB device to the computing device, the enabling of the computing device with the wireless Internet access being subsequent to the portable wireless communication USB device being connected to the structural non-wireless external USB port of the computing device, and
 wherein, upon a disconnection of the portable wireless communication USB device from the computing device, the portable wireless communication USB device no longer enables the computing device with the wireless Internet access through the wireless communication component of the portable wireless communication USB device;
 wherein the computing device includes at least part of wireless communication software installed prior to connecting the portable wireless communication USB device to the computing device and the at least part of protected data from the internal memory circuitry of the portable wireless communication USB device is provided to the wireless communication software running at the computing device; and
 wherein the at least part of the protected data, which is stored in the internal memory circuitry of the portable wireless communication USB device, is implemented to be not accessible by a user at the internal memory circuit of the portable wireless communication USB device, but is implemented to be accessible by the memory controller of the portable wireless communication USB device.

40. The portable wireless communication USB device method of claim 39 further comprising enabling and activating at least part of the wireless communication component of the portable wireless communication USB device.

41. The portable wireless communication USB device method of claim 39 in which the at least part of protected data includes a wireless software component and the portable wireless communication USB device method further comprises launching and executing at least part of the wireless software component upon connecting the portable wireless communication USB device to the structural non-wireless external USB port of the computing device.

42. The portable wireless communication USB device method of claim 39 in which the computing device further includes an interface that enables a wireless Internet sharing function or a phone calling service function.

43. The portable wireless communication USB device method of claim 39 in which the wireless communication software further provides a graphical user interface (GUI) for obtaining authentication information related to the user for wireless connection.

44. The portable wireless communication USB device method of claim 39, in which the computing device comprises at least one of a desktop PC, a laptop PC, a tablet computer, a server, a handheld computer, an Internet information appliance, a digital camera, a mobile phone, or a web pad, individually or in any combination.

45. A method for providing a computing device with wireless Internet access through a portable wireless communication USB device, the portable wireless communication USB device not being an integrated part of the computing device and the portable wireless communication USB device including:
  a USB device interface that is user-connectable to, and user-disconnectable from, a non-wireless external USB port of the computing device,
  a wireless communication component that includes a radio and a baseband controller for enabling wireless radio frequency communication,
  an interface for connecting to a memory component storing at least part of wireless Internet access data, and
  a controller for managing communication through the USB device interface; the method comprising:
  accessing, by the controller, the at least part of wireless Internet access data from the memory component subsequent to connecting the USB device interface to the non-wireless external USB port of the computing device;
  providing, by the controller, the at least part of wireless Internet access data, accessed from the memory component, from the memory component of the portable wireless communication USB device to the computing device subsequent to connecting the portable wireless communication USB device to the non-wireless external USB port of the computing device; and
  enabling the computing device with wireless Internet access via the wireless communication component of the portable wireless communication USB device with the at least part of wireless Internet access data provided from the memory component of the portable wireless communication USB device to the computing device, the enabling of the computing device with the wireless Internet access being while the portable wireless communication USB device is connected to the non-wireless external USB port of the computing device, and the at least part of wireless Internet access data being related to activating at least part of the wireless communication component of the portable wireless USB communication device; and wherein upon a disconnection of the portable wireless communication USB device from the computing device, the portable wireless communication USB device no longer enables the computing device with wireless Internet access via the wireless communication component of the portable wireless communication USB device; and
  wherein the computing device includes at least part of wireless software installed or pre-installed prior to connecting the portable wireless communication USB device to the computing device; and wherein the at least part of wireless Internet access data, which is stored at the memory component of the portable wireless communication USB device, is implemented to be not accessible by a user of the computing device at the memory component of the portable wireless communication USB device, but is implemented to be accessible by the controller.

46. The method of claim 45 in which the at least part of wireless Internet access data is associated with the wireless software, and connecting the portable wireless communication USB device to the non-wireless external USB port of the computing device automatically executes and activates the wireless software subsequent to connecting the portable wireless communication USB device to the non-wireless external USB port of the computing device.

47. The method of claim 45 in which the wireless software employs the at least part of wireless Internet access data from the memory component of the portable wireless communication USB device for enabling the computing device with wireless Internet access, and the memory component is for storing instructions and data required for functioning of the wireless communication component.

48. The method of claim 46 or 47 in which the wireless software further provides a graphical user interface (GUI) for obtaining authentication information related to the user for wireless connection.

49. The method of claim 45 further comprising enabling the computing device with one or more functions including at least one of messaging, e-mail, phone calling, file transferring, file sharing, document editing/collaboration, Internet sharing, or outputting data to an output device, individually or in any combination, when the portable wireless communication USB device is connected to the non-wireless external USB port of the computing device.

50. The method of claim 45 in which the memory component further comprises a public memory area for storage of data, the data stored in the public memory area being accessible and viewable by the user of the portable wireless communication USB device when the portable wireless communication USB device is plug connected to the non-wireless external USB port of the computing device.

51. A method for providing a computing device with wireless Internet access via a portable wireless communication USB device, the portable wireless communication USB device not being an integrated part of the computing device and including:
  a structural USB device interface that is user-connectable to and user-disconnectable from a structural non-wireless external port of the computing device,
  a wireless communication component that includes a radio and a baseband controller for enabling wireless radio frequency communication that is compliant, at least in part, with one or more wireless protocols,
  a memory component storing computing software data, and
  a controller for managing communication through the structural USB device interface and for accessing the memory component, the method comprising:
  accessing, by the controller, at least part of the computing software data from the memory component at the portable wireless communication USB device subsequent to the portable wireless communication USB device being connected to the structural non-wireless external port of the computing device;
  installing or executing, at the computing device, automatically at least part of the computing software data, which is accessed by the controller, from the memory component of the portable wireless communication USB device to the computing device subsequent to connecting the portable wireless communication USB device to the structural non-wireless external port of the computing device;
  enabling the computing device with wireless Internet access through the wireless communication component of the portable wireless communication USB device by computing software executing at the computing device, and the computing software employing the at least part of the computing software data accessed, by the controller, from the memory component of the portable wireless communication USB device, and the enabling of the computing device with the wireless Internet access via the wireless communication component of the portable wireless communication USB device being while the portable wireless communication USB device is connected to the computing device via the structural non-wireless external port of the computing device; and intercepting a disconnection signal of the portable wireless communication USB device at the computing device, and, in response to intercepting the disconnection signal at the computing device, not enabling the computing device with the wireless Internet access or not activating at least part of the computing software for the wireless Internet access via the wireless communication component of the portable wireless communication USB device; and wherein the computing software data stored in the memory component of the portable wireless communication USB device does not include a device driver for installing at the computing device; and wherein the computing software data stored in the memory component of the portable wireless communication USB device is not accessible by a user at the memory component of the portable wireless communication USB device, but is accessible by the controller of the portable wireless communication USB device; and wherein automatic execution, at the computing device, of the at least part of the computing software data is enabled, at least in part, by the controller.

52. The method of claim 51 in which the computing software further provides a graphical user interface (GUI) for obtaining authentication information related to a user for wireless connection.

53. The method of claim 51, wherein the wireless communication component of the portable wireless communication USB device further enables a wireless Internet sharing function form the computing device over a wireless communication link to a second computing device that is distinct from the computing device.

54. The method of claim 51 further comprising enabling the computing device with one or more functions including at least one of messaging, e-mail, phone calling, file transfer, file sharing, document editing/collaboration, Internet sharing, or outputting data, individually or in any combination, subsequent to connecting the portable wireless communication USB device to the structural non-wireless external port of the computing device.

55. The method of claim 51, wherein the computing device further comprises at least one of a desktop PC, a laptop PC, a tablet computer, a server, a handheld computer, an Internet information appliance, a digital camera, a mobile phone, or a web pad, individually or in any combination.

56. The method of claim 51 wherein the one or more wireless protocols is compatible with at least one protocol within one or more IEEE802 standards of wireless communication or within Wi-Fi communications.

57. A portable wireless communication USB device to provide a computing device with wireless Internet access through the portable wireless communication USB device, the portable wireless communication USB device not being an integrated part of the computing device, the portable wireless communication USB device comprising:

a structural USB device interface that is user-connectable to and user-disconnectable from a structural non-wireless external USB port of the computing device;

a wireless communication component that includes a radio and a baseband controller for enabling wireless radio frequency communication;

a memory component, at the portable wireless communication USB device, storing therein at least part of wireless Internet access data, the at least part of wireless Internet access data is operable to automatically execute on the computing device subsequent to connecting the structural USB device interface of the portable wireless communication USB device to the structural non-wireless external USB port of the computing device to provide the computing device with wireless Internet access through the wireless communication component of the portable wireless communication USB device; and a controller for:

managing communication through the structural USB device interface, automatically providing at least part of the wireless Internet access data from the memory component to the computing device via the structural USB device interface, accessing at least part of the wireless Internet access data from the memory component, and obtaining at least part of the wireless Internet access data from the memory component, upon connecting the portable wireless communication USB device to the computing device; and wherein the at least part of the wireless Internet access data, which is stored at the memory component, is not accessible by a user of the computing device at the memory component of the portable wireless communication USB device, but is accessible by the controller of the portable wireless communication USB device; and wherein automatic execution, at the computing device, of the at least part of the wireless Internet access data is enabled, at least in part, by the controller; and wherein the wireless Internet access data, stored in the memory component and automatically executed at the computing device, includes software or data for enabling wireless communication of the computing device using the wireless communication component of the portable wireless communication USB device.

58. The portable wireless communication USB device of claim 57, wherein the at least part of wireless Internet access data is operable to be automatically removed from the computing device, or to be automatically uninstalled from the computing device, upon disconnection of the portable wireless communication USB device from the computing device.

59. The portable wireless communication USB device of claim 57 wherein the at least part of wireless Internet access data includes computing software, and upon connecting the portable wireless communication USB device to the structural non-wireless external USB port of the computing device, the portable wireless communication USB device is configured to automatically executed the computing software at the computing device.

60. The portable wireless communication USB device of claim 57 wherein the portable wireless communication USB device is further configured to provide the computing device with one or more functions including at least one of messaging, e-mail, phone calling, file transfer, file sharing, Internet sharing, or document editing/collaboration, individually or in any combination.

61. The portable wireless communication USB device of claim 57 wherein the portable wireless communication USB device is connectable to the computing device, and the computing device comprises at least one of a desktop PC, a laptop PC, a tablet computer, a server, a handheld computer, an Internet information appliance, a digital camera, a mobile phone, or a web pad, individually or in any combination.

62. The portable wireless communication USB device of claim 57 wherein the wireless communication component complies with at least one protocol within one or more IEEE802 wireless standards of wireless communication or within Wi-Fi communications.

63. The portable wireless communication USB device of claim 57 further includes a hub with one or more ports for connecting the portable wireless communication USB device to other devices.

64. The portable wireless communication USB device of claim 57 wherein the controller further manages the wireless communication component.

65. A portable communication USB device for providing at least an Internet access operation or an Internet sharing operation to a computing device, the portable communication USB device not being an integrated part of the computing device and being connectable to, and disconnectable from, an external USB port of the computing device by a user of the portable communication USB device, the portable communication USB device comprising:
- a USB interface for connecting to an external non-wireless USB port of the computing device;
- a memory circuit storing at least part of an Internet access software component or Internet sharing software component;
- a memory controller that is executable to:
  - manage communication between the memory circuit and the USB interface, and
  - facilitate an automatic operation for automatically activating or launching or executing, on the computing device, at least part of the Internet access software component or Internet sharing software component subsequent to connecting the USB interface to the computing device, the automatic operation including accessing protected data stored at the memory circuit, which is to be automatically executed on the computing device when the portable communication USB device is connected to the external non-wireless USB port of the computing device;
- wherein the portable communication USB device is operable to activate or launch or execute the at least part of the Internet access software component or Internet sharing software component automatically on the computing device subsequent to connection of the portable communication USB device to the computing device to enable the Internet access operation or the Internet sharing operation with the computing device, the enabling of the Internet access operation or the Internet sharing operation with the computing device includes accessing the protected data from the memory circuit of the portable communication USB device; and
- wherein upon disconnection of the portable communication USB device from the external non-wireless USB port of the computing device, the portable communication USB device automatically ceases to execute or automatically ceases to provide at least part of the protected data or the at least part of Internet access software component or Internet sharing software component at the computing device; and
- wherein the protected data or the Internet access software component or Internet sharing software component, which is stored at the memory circuit, is implemented to be not accessible by the user of the portable communication USB device at the memory circuit of the portable communication USB device, but is implemented to be accessible by the memory controller of the portable communication USB device; and wherein automatic execution, at the computing device, of the protected data or the Internet access software component or Internet sharing software component is enabled, at least in part, by the memory controller; and
- wherein the at least part of the Internet access software component or Internet sharing software component stored in the memory circuit of the portable communication USB device does not include a driver, specific to the portable communication USB device, for installing at the computing device.

66. The portable communication USB device of claim 65, for providing at least the Internet access operation or the Internet sharing operation to the computing device, wherein the computing device further comprises at least one of a desktop PC, a laptop PC, a tablet computer, a server, a handheld computer, an Internet information appliance, a digital camera, a mobile phone, or a web pad, individually or in any combination.

67. The portable communication USB device of claim 65 wherein the at least part of the Internet access software component or Internet sharing software component further comprises at least one of an Internet access function, an Internet sharing function, or a phone calling function, individually or in any combination.

68. The portable communication USB device of claim 67 wherein the at least part of the Internet access software component or Internet sharing software component are embedded into the portable communication USB device during manufacturing of the portable communication USB device.

69. The portable communication USB device of claim 65 wherein the computing device includes computing software running at the computing device to enable an operation that includes at least one of exiting, uninstalling, or removing the at least part of the Internet access software component or Internet sharing software component from the computing device upon detecting disconnection of the portable communication USB device from the computing device.

70. The portable communication USB device of claim 65 further including a wireless communication component comprising at least a radio component and a baseband controller for enabling wireless radio frequency communication.

71. The portable communication USB device of claim 65 in which the portable communication USB device further includes an interface that enables a phone calling service.

72. The portable communication USB device of claim 65 in which the portable communication USB device further includes one or more interfaces that corresponds to a Wi-Fi interface, a Bluetooth interface, a ZigBee interface, a Firewire interface, an Ethernet interface, or a Secure Digital interface, individually or in any combination.

73. A method for providing at least an Internet access operation or an Internet sharing operation with a portable communication USB device that is connectable to and disconnectable from an external port of a computing device by a user of the portable communication USB device, the portable communication USB device not being an integrated part of the computing device and including:
- a USB interface for connecting to a structural non-wireless external USB port of a computing device,
- a memory circuit storing an Internet access software component or Internet sharing software component for enabling the Internet access operation or the Internet sharing operation with the computing device, the memory circuit including a private memory area storing at least part of protected data;

a memory controller that is executable to:
  manage communication between the memory circuit and the USB interface,
  facilitate an operation for automatically launching and executing, on the computing device, at least part of the Internet access software component or Internet sharing software component subsequent to connecting the USB interface of the portable communication USB device to the computing device, and
  access the at least part of protected data from the private memory area of the memory circuit to automatically launch or execute or activate at least part the Internet access software component or Internet sharing software component from the memory circuit on the computing device upon connecting the USB interface of the portable communication USB device to the computing device; the method comprising:
launching and executing automatically the at least part of the Internet access software component or Internet sharing software component from the memory circuit of the portable communication USB device on the computing device subsequent to connecting the portable communication USB device to the structural non-wireless external USB port of the computing device;
accessing by the memory controller, the at least part of protected data stored in the private memory area of the memory circuit;
enabling the Internet access operation or the Internet sharing operation at the computing device using the at least part of the Internet access software component or Internet sharing software component, and the using of the at least part of the Internet access software component or Internet sharing software component employs, at least in part, the at least part of protected data accessed by the memory controller from the private memory area of the memory circuit, and the enabling of the Internet access operation or the Internet sharing operation being while the portable communication USB device is connected to the structural non-wireless external USB port of the computing device; and,
upon disconnection of the portable communication USB device from the computing device, automatically not enabling the Internet access operation or the Internet sharing operation at the computing device with the portable communication USB device; and
wherein the Internet access software component or Internet sharing software component stored in the memory circuit of the portable communication USB device does not include a driver that is specific to the portable communication USB device, for installing at the computing device; and
wherein the at least part of the Internet access software component or Internet sharing software component, which is stored at the memory circuit, is not accessible by the user at the memory circuit of the portable communication USB device, but is accessible by the memory controller of the portable communication USB device; and
wherein automatic execution, at the computing device, of the Internet access software component or Internet sharing software component is enabled, at least in part, by the memory controller.

74. The method of claim 73 in which the memory circuit further includes a public memory area storing data that is viewable and accessible by the user when the portable communication USB device is plug connected to the structural non-wireless external USB port of the computing device.

75. The method of claim 73 wherein the portable communication USB device further comprises autorun software for automatically launching and executing, on the computing device, the at least part of the Internet access software component or Internet sharing software component subsequent to connecting the USB interface of the portable communication USB device to the computing device.

76. The method of claim 73 further includes Internet access computing software or Internet sharing computing software installed or preinstalled at the computing device, and the method further comprising exiting the at least part of the Internet access computing software or Internet sharing computing software from the computing device subsequent to disconnection of the portable communication USB device from the computing device.

77. The method of claim 73 wherein the memory circuit further stores at least part of a phone calling component for enabling phone calling service.

78. The method of claim 73 in which the portable communication USB device further includes at least one interface that corresponds to a Wi-Fi interface, a Bluetooth interface, a ZigBee interface, a Firewire interface, an Ethernet interface, or a Secure Digital interface, individually or in any combination.

79. The method of claim 73 in which the portable communication USB device further includes a wireless communication component comprising at least a radio component and a baseband controller for enabling wireless radio frequency communication.

80. A method for providing protected data related, at least in part, to an Internet access operation or an Internet sharing operation at a portable communication USB device that is connectable to, and disconnectable from, an external port of a computing device by a user of the portable communication USB device, the portable communication USB device not being an integrated part of the computing device and including:
  a USB interface for connecting to an external non-wireless USB port of the computing device,
  a memory circuit storing protected data in a private area of the memory circuit, the protected data is related to at least part of Internet access software component data or Internet sharing software component data for enabling the Internet access operation or the Internet sharing operation at the computing device;
  a memory controller having a processor that is executable to:
    manage communication between the memory circuit and the USB interface, and
    access the protected data from the private area of the memory circuit, the method comprising:
  automatically providing, from the portable communication USB device to the computing device, at least part of the protected data related, at least in part, to the at least part of Internet access software component data or Internet sharing software component data subsequent to connection of the portable communication USB device to the external non-wireless USB port of the computing device; and
  establishing the Internet access operation or the Internet sharing operation at the computing device by employing the at least part of the protected data, and the establishing of the Internet access operation or the Internet sharing operation being while the portable communication USB device is connected to the external non-wireless USB port of the computing device; and wherein, subsequent to a disconnection of the portable communication USB device from the external non-wireless USB port of the computing device, the portable communication USB device no longer enables the Internet access operation or the Internet sharing operation at the computing device via the portable communication USB device; and wherein the protected data stored in the private area of the memory circuit of the portable communication USB device does not include a device driver for installing at the computing device; and wherein the protected data, which is stored at the private area of the memory circuit, is not accessible by the user at the memory circuit of the portable communication USB device, but is accessible by the memory controller; and wherein the automatic providing, at the computing device, of the at least part of the protected data is enabled, at least in part, by the memory controller.

81. The method of claim 80 in which the memory circuit further stores the at least part of Internet access software component data or Internet sharing software component data and connecting the portable communication USB device to the external non-wireless USB port of the computing device automatically installs or executes the at least part of Internet access software component data or Internet sharing software component data at the computing device.

82. The method of claim 80 in which, when the portable communication USB device is disconnected from the external non-wireless USB port of the computing device, the disconnection causes at least one of an exit, or an uninstall, or a removal of at least part of Internet access software or Internet sharing software, or the at least part of Internet access software component data, or the Internet sharing software component data, or the at least part of the protected data from the computing device.

83. The method of claim 80 wherein the portable communication USB device further comprises one or more of a Wi-Fi interface, a Secure Digital interface, an Ethernet interface, a Bluetooth interface, a ZigBee interface, or a wireless interface, individually or in any combination.

84. The method of claim 80 wherein the portable communication USB device further includes at least one of: (1) a wireless component for wireless communication, or (2) a phone calling software component for enabling a phone call service, individually or in any combination.

85. The method of claim 80 in which the portable communication USB device further enables a phone calling service.

86. A portable communication USB device for providing at least a component to a computing device, the component related, at least in part, to an Internet access operation or an Internet sharing operation, the portable communication USB device not being an integrated part of the computing device and being connectable to and disconnectable from an external port of the computing device by a user of the portable communication USB device, the portable communication USB device comprising:

a USB interface for connecting to a structural non-wireless external USB port of the computing device;

a memory circuit storing an Internet access software component or Internet sharing software component, the memory circuit including an internal memory area, at least part of the Internet access software component or Internet sharing software component being stored in the internal memory area;

a memory controller having a processor that is executable to:
manage communication between the memory circuit and the USB interface,
facilitate an operation for providing or launching or executing, on the computing device, the at least part of the Internet access software component or Internet sharing software component upon connecting the USB interface of the portable communication USB device to the computing device, and
access the internal memory area of the memory circuit;

wherein the portable communication USB device is operable to provide the at least part of the Internet access software component or Internet sharing software component to the computing device subsequent to connecting the portable communication USB device to the computing device, to facilitate the Internet access operation or the Internet sharing operation with the computing device, and the memory controller being operable to access the internal memory area of the portable communication USB device with the portable communication USB device connected to the structural non-wireless external USB port of the computing device; and wherein, subsequent to a disconnection of the portable communication USB device from the computing device, the portable communication USB device no longer enables the Internet access operation or the Internet sharing operation with the computing device; and wherein the at least part of the Internet access software component or Internet sharing software component provided by the portable communication USB device to the computing device does not include a device driver that is specific to the portable communication USB device, for installing at the computing device; and wherein at least part of the Internet access software component or Internet sharing software component, which is stored at the internal memory area of the memory circuit, is implemented to be not accessible by a user of the computing device at the internal memory area of the memory circuit of the portable communication USB device, but is implemented to be accessible by the memory controller; and wherein providing or launching or execution, at the computing device, of the at least part of the Internet access software component or Internet sharing software component is enabled, at least in part, by the memory controller; and wherein the accessing, by the memory controller, of the at least part of the Internet access software component or Internet sharing software component, from the internal memory area of the memory circuit, is for providing or launching or execution of the at least part of the Internet access software component or Internet sharing software component on the computing device upon connecting the portable communication USB device to the computing device.

87. The portable USB device of claim 86 further comprising at least one interface that corresponds to a Wi-Fi interface, a Bluetooth interface, a ZigBee interface, a Firewire interface, an Ethernet interface, or a Secure Digital interface, individually or in any combination.

88. The portable communication USB device of claim 86 further comprising one or more of:
(1) a hub having one or more ports for connecting the portable communication USB device to one or more components or devices, or
(2) a wireless component for providing wireless connection or for wireless Internet accessing or a file sharing service, or
(3) a phone calling software component for providing a phone calling service, individually or in any combination.

89. The portable communication USB device of claim 86 wherein Internet access software component or Internet sharing software component running at the computing device is configured to exit or uninstall or remove the at least part of the Internet access software component or Internet sharing software component from the computing device upon disconnection of the portable communication USB device from the computing device.

90. The portable communication USB device of claim 86 wherein the at least part of the Internet access software component or Internet sharing software component stored in the internal memory area includes data or software, individually or in any combination, for enabling Internet access, or for Internet sharing, or for phone calling, or for data sharing, individually or in any combination, and the at least part of the Internet access software component or Internet sharing software component is embedded in the portable communication USB device during manufacturing of the portable communication USB device.

91. The portable communication USB device of claim 86 wherein the memory circuit further comprises a public memory area for storage of data that is configured to be accessible and viewable by the user of the portable communication USB device, and the user of the portable communication USB device accesses or views the data at the public memory area while the portable communication USB device is plug connected to the external USB port of the computing device.

* * * * *